(12) United States Patent
Yasuhara et al.

(10) Patent No.: US 8,276,976 B2
(45) Date of Patent: Oct. 2, 2012

(54) VEHICLE BODY FRONT STRUCTURE

(75) Inventors: Shigeto Yasuhara, Wako (JP); Makoto Kihara, Wako (JP); Yuji Matsuura, Tochigi (JP); Masami Kominamidate, Wako (JP); Masahito Shirasaya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/393,071

(22) PCT Filed: Jul. 26, 2010

(86) PCT No.: PCT/JP2010/062537
§ 371 (c)(1),
(2), (4) Date: Feb. 28, 2012

(87) PCT Pub. No.: WO2011/027633
PCT Pub. Date: Mar. 10, 2011

(65) Prior Publication Data
US 2012/0153679 A1 Jun. 21, 2012

(30) Foreign Application Priority Data

Sep. 2, 2009 (JP) .................................. 2009-202839
Feb. 8, 2010 (JP) .................................. 2010-025276
Mar. 4, 2010 (JP) .................................. 2010-047927

(51) Int. Cl.
B60J 7/00 (2006.01)
(52) U.S. Cl. .............................. 296/187.09; 296/203.02

(58) Field of Classification Search ............. 296/187.09, 296/193.09, 203.02
See application file for complete search history.

(56) References Cited

U.S. PATENT DOCUMENTS 7,887,122 B2 * 2/2011 Baccouche et al. ...... 296/187.09
2006/0232104 A1 10/2006 Yasuhara

FOREIGN PATENT DOCUMENTS

| JP | S62-173277 | 11/1987 |
| JP | H03-98182 | 10/1991 |
| JP | 2006-290311 | 10/2006 |

* cited by examiner

Primary Examiner — Joseph Pape
(74) Attorney, Agent, or Firm — Rankin, Hill & Clark LLP

(57) ABSTRACT

A vehicle body front structure provided with left and right side frames (16, 17). The left front side frame (16) has a rectangular closed cross-sectional shape. The front side frame (16) is provided with a rectilinear section (front half frame section) (44) extending rectilinearly from the front end (58) to the center section (43), and also with a moment receiving section (rear half frame section) (45) continuing from the rectilinear section (44) and extending in a curved form toward the inner side in the widthwise direction of the vehicle. A first ridge line section (78) is a portion which forms a corner (78) among the corners (78) of the rectilinear section (45), said corner (78) being located on the inner side in the widthwise direction of the vehicle. A second ridge line section (84) is connected to the first ridge line section (78) at a position inside the moment receiving section (45). A stiffener (65) is connected to the rear end (66) of the front side frame (16).

18 Claims, 21 Drawing Sheets

VEHICLE BODY FRONT STRUCTURE

TECHNICAL FIELD

The present invention relates to a front structure of a vehicle body including left and right curved front side frames extending forward from a floor of a passenger compartment.

BACKGROUND ART

Some front part structures of vehicle bodies are provided with front side frames curving to the left and right of the engine disposed to the front of the passenger compartment. The front side frame is designed to minimize deformation during a collision, and is composed of an axial load receiving member comprising a first ridge line extending rectilinearly across the entire length in the lengthwise direction, and a moment receiving member branched from an approximately center section in the longitudinal direction of the first ridge line, and comprising a second ridge line which curves inwardly in the widthwise direction of the vehicle toward the rear of the vehicle (see Patent Literature 1, for example).

However, the axial load receiving member and the moment receiving member of the front side frame disclosed in Patent Literature 1 have shapes that taper from a thin tip to a thick base, and an associated problem is high production cost of the dies employed during plastic working of these. Another problem is a difficultly in handling, due to the thin tip sections being readily deformed and respectively different in size. Also, when the axial load receiving member and the moment receiving member are assembled together, positioning of the members is difficult, and workability is poor.

PRIOR ART LITERATURE

Patent Literature

Patent Literature 1: JP-A-2006-290311

SUMMARY OF INVENTION

Technical Problem

It is an object of the present invention to provide a vehicle body front structure which ensures sufficient strength of the front side frames during a head-on collision, and which affords ease of plastic working, ease of handling, and ease of assembly.

Solution to Problem

According to one aspect of the present invention, there is provided a front part structure of a vehicle body, comprising: a front body including left and right front side frames extending forward from a floor of a passenger compartment; a stiffener; the left and right front side frames each including a frame body having a rectangular closed cross-section; the frame body including an inner wall defining a lateral inside of the frame body, and an outer wall defining a lateral outside of the frame body; the frame body comprising: a front end; a center; a front half extending from the front end to the center, the front half defining a rectilinear section of the frame body; a rear half contiguous with the rectilinear section and curved laterally inward of the vehicle body, the rear half defining a moment receiving section of the frame body; the rectilinear section having corners including an inner corner defining a first ridge; the stiffener being connected to a rear end of the front side frame; the stiffener having a rectilinear second ridge located within the moment receiving section, the second ridge being connected to the first ridge.

Preferably, the front part structure of the vehicle body further comprises a bulkhead disposed within the front side frame, and the first and second ridges are connected to each other with the bulkhead joined to a front section of the stiffener.

Preferably, the first ridge and the second ridge define a lower end of the lateral inside of the frame body, and the stiffener has a rear section contiguous with an outer wall section of an outrigger connected to one of side sills located on left and right sides of an underbody. The outer wall section of the outrigger defines a lateral outside of the outrigger.

Preferably, the front part structure of the vehicle body further comprises a bulkhead joined to the center of the frame body defining a boundary between the front and rear halves of the frame body. The inner wall comprises: a front end; a front half extending rectilinearly from the front end to a center of the bulkhead, the front half of the inner wall defining an axial load bearing section of the frame body; and a curved rear half contiguous with the front half defining the axial load bearing section. The front side frame has three bends including a first valley, a crest and a second valley, and the outer wall comprises: a front section; a center section; a rear section; the first valley being formed at a boundary between the front section of the outer wall and the center section of the outer wall; the crest being formed at a boundary between the center section of the outer wall and the rear section of the outer wall; the second valley being formed at a rear end of the rear section of the outer wall; the outer wall having a front bulkhead-connected portion connected to one end portion of the bulkhead; the front section of the outer wall extending in an inclined fashion toward the front bulkhead-connected portion such that the frame body has a cross-sectional area reducing gradually toward the front bulkhead-connected portion; the outer wall having a rear bulkhead-connected portion connected to an opposite end portion of the bulkhead; the center section of the outer wall extending from the first valley to the rear bulkhead-connected portion in substantially parallel to the front half of the inner wall; and the rear section of the outer wall being substantially parallel to the rear half of the inner wall.

Preferably, the one end portion of the bulkhead overlaps and is joined to the front bulkhead-connected portion of the outer wall, the opposite end portion of the bulkhead overlaps and is joined to the rear bulkhead-connected portion of the outer wall, and the center of the bulkhead overlaps and is joined to the front half of the inner wall.

Preferably, the outer wall has depressions defined by the first and second valleys.

Preferably, the front part structure of the vehicle further comprises a box member joining a rear end of the frame body to a floor frame constituting part of the floor, wherein the stiffener is disposed within the rear half of the frame body. The stiffener has a front end joined to the front half of the frame body and a rear end joined to a rear end of the outer wall. The box member has an outer section joined to the rear end of the stiffener and an inner section joined to the rear end of the frame body, and the inner section of the box member is opposed to the outer section of the box member.

Preferably, the front part structure of the vehicle body further comprises a bulkhead connected to an inside of the center of the frame body between the front half of the frame body and the rear half of the frame body. The front end of the stiffener is joined by the bulkhead to the inner wall of the frame body.

Preferably, the stiffener has an upper flange joined to an upper wall contiguous with the inner and outer walls, and a lower flange joined to a lower wall contiguous with the inner and outer walls.

Preferably, the front half of the frame body includes a rectilinear front half of an axial load bearing section of the frame body. The front half of the axial load bearing section of the frame body is defined by a front half of the inner wall. The rear half of the frame body includes a curved rear half of the inner wall contiguous with the front half of the axial load bearing section of the frame body. The stiffener extends rectilinearly and defines a rear half of the axial load bearing section of the frame body. The rear half of the axial load bearing section of the frame body is contiguous with the front half of the axial load bearing section of the frame body. The stiffener has one end contiguous with the front half of the axial load bearing section of the frame body and an opposite end connected to the rear end of the outer wall. The front side frame has three bends including a first valley, a crest and a second valley. The vehicle body front structure further comprises a bulkhead connected to an inside of the center of the frame body between the front half of the frame body and the rear half of the frame body. The outer wall includes: a front section extending in an inclined fashion toward the bulkhead such that the frame body has a cross-sectional area reducing gradually toward the bulkhead; a center section extending along the bulkhead in substantially parallel to the front half of the axial load bearing section; and a rear section extending in substantially parallel to the rear half of the inner wall. The first valley defines a boundary between the front section of the outer wall and the center section of the outer wall. The crest defines a boundary between the center section of the outer wall and the rear section of the outer wall. The second valley is formed at the rear end of the rear section of the outer wall.

Preferably, the bulkhead has a portion interconnecting the front half of the axial load bearing section and the rear half of the axial load bearing section. The bulkhead is joined to the center section of the outer wall, and the center section of the outer wall is opposed to the portion of the bulkhead.

Preferably, the outer wall has depressions defined by the first and second valleys.

Advantageous Effect of Invention

Even the front side frame has the curved configuration, the front side frame provides a rectilinear transmission path defined by the first ridge of the rectilinear section and the rectilinear second ridge connected to the first ridge, such that to the load borne during a head-on collision of a vehicle is transmitted rectilinearly from the first ridge to the second ridge. Consequently, strength of the front side frame can be ensured.

The front side frame comprises a rectilinear frame section and a curving frame section. In comparison to cases in which the respective frames are plastically worked into a wedge form with different groove depths by a press machine, the front side frame of the present invention affords greater ease of plastic working, ease of handling, and ease of assembly. Further, manufacture of the press dies used for plastic working is facilitated. Moreover, an advantage is presented in regard to higher accuracy in assembly than, for example, with a front side frame of the rectilinear frame section and the curving frame section, which are linked together.

Because the first ridge and the second ridge are coupled together with the front section of the stiffener joined to a bulkhead provided within the front side frame, load can be transmitted reliably from the first ridge to the second ridge, and can also be dispersed into corners and zones located in opposition to the first ridge, to the outer side in the widthwise direction of the vehicle with respect to the bulkhead.

The first and second ridges are formed at an inner side of the frame body and, the outrigger coupled to the side sill which forms the left or right end of the floor of the passenger compartment has the outer wall section which faces outward of the vehicle and is contiguous with the rear section of the stiffener. This arrangement has the advantage that load can be transmitted to the side sill over the shortest distance. Specifically, the front side frame transmits load to the lower rectilinear section (from the first ridge to the second ridge), transmits load from the lower rectilinear section to the outer wall section of the outrigger, and transmits load to the side sill. This means that the load is transmitted over a route through the outrigger, which route is closest to the side sill relative to the remaining zones.

The front wall includes the front section inclined toward the front bulkhead-connected portion, the first valley, the center section, the crest, the rear section, and the second valley. This arrangement is advantageous in that the increase in weight of the front side frame can be held to an amount approximately commensurate with the weight of the stiffener and the inside bulkhead, and the front side frame can absorb impact over a relatively wide range from low impact (load) to high impact (load).

When the impact of a head-on collision of the vehicle is low, the impact is absorbed through crumpling of only the front half of the frame body of the front side frame. Because the center section which continues from the front half is provided with the bulkhead and the stiffener, it crumples less readily as compared with the front half. When impact is high, for example, during an offset collision, the front side frame is bent at the first valley, the crest, and the second valley due to the load of the collision, whereby the front side frame experiences three-fold folding deflection to absorb the impact force. Further, because the impact load is delivered outwardly from the bulkhead to the crest, the front side frame experiences folding deflection so as to push out toward the outer side in the widthwise direction of the vehicle.

Because the bulkhead is joined with the one end thereof overlapping the front bulkhead-connected portion of the outer wall, the opposite end thereof is joined overlapping the rear bulkhead-connected portion of the outer wall, and the center thereof is joined overlapping the front half of the inner wall defining the axial load bearing section, the through-thickness of the front bulkhead-connected portion and the through-thickness of the rear bulkhead-connected portion are greater by the equivalent of the added bulkhead thickness. As a result, the through-thickness of the crest which forms the boundary is less than the total through-thickness of the front bulkhead-connected portion and the total through-thickness of the rear bulkhead-connected portion, and the crest of the front side frame readily undergoes folding deflection so as to push out toward the outer side in the widthwise direction of the vehicle with respect to a desired load.

Further, when the vehicle experiences a head-on load (impact), the load (impact) is delivered, via the bulkhead, from the rectilinear front half of the inner wall defining the axial load bearing section to the front bulkhead-connected portion and the rear bulkhead-connected portion of the outer wall. As a result, the load bears outwardly from the inner wall toward the outer wall, and therefore the front side frame easily undergoes folding deflection in the crest thereof, so as to push out toward the outer side in the widthwise direction of the vehicle, in response to a desired load.

Because the first and second valleys are formed by depressing the outer wall, a greater concentration of load (stress) arises in the first and second valleys. Consequently, folding deflection of the front side frame in relation to a desired load takes place more easily.

In the front side frame, each of the frame bodies is formed with a hollow rectangular cross-sectional shape rectilinear at the front side and extending in a curved form at the rear side so as to approach one another, and comprises an inner wall facing toward the inside of the vehicle, and an opposing outer wall. A floor frame is joined by the box member to the rear end of the frame body, and a stiffener is disposed within the rear side of the frame body. The front end of the stiffener is joined to the boundary with the front side in the inner wall, and the rear end of the stiffener is joined to the rear end of the outer wall. The outer section of the box member is joined to the rear end of the stiffener, and the rear end of the frame body is joined to the inner section opposing the outer section of the box member. Therefore, when the vehicle experiences a head-on impact (load), the force becomes concentrated in a zone (fold section) immediately in front of where the box member is located, so folding can take place from the fold section. Specifically, folding reliably takes place at the location where the fold section has been established, and impact force can be cushioned.

A zone which continues from the zone (fold section) immediately in front of where the posterior box member is located and which is mated with the box member maintains a rectangular cross section owing to the presence of the box member, and does not collapse. As a result, there is minimal deviation of the location of folding, and impact force can be cushioned reliably at locations where the fold sections have been established.

Further, it suffices merely to dispose the stiffener inside, and to join the box member to the rear end of the frame body of the front side frame, so the vehicle body front structure is easily manufactured.

The structure of the die used for plastic working of the front side frame (frame body) is simple, and the die is easily manufactured.

Because the stiffener for delivering impact (load) in rectilinear fashion is disposed inside, the front side frame is highly accurate and easily assembled.

According to the present invention, because the bulkhead is connected to the inside at the boundary of the front side and the rear side of the frame body, the front end of the stiffener being joined to the inner wall of the frame body by the bulkhead, head-on impact force borne by the vehicle in a compressing direction can also be actively dispersed from the inner wall to the outer wall of the frame body via the rectilinearly-extending stiffener.

Further, because the upper flange and the lower flange of the stiffener are respectively joined to the upper wall and the lower wall which continue from the inner wall and the outer wall of the frame body, the interior of the rectangular cross section of the frame body is split into left and right parts by the stiffener, to form left and right closed cross-sectional shapes. As a result, folding of the front side frame in the vertical direction of the vehicle can be prevented.

The inner wall has the front half defining a rectilinear front half of the axial load bearing section, and the curved rear half contiguous with the front half. The stiffener extends rectilinearly with the one end contiguous with the front half and with the opposite end connected to the rear end of the outer wall, whereby the stiffener functions as a rear half of the axial load bearing section. The rear half of the axial load bearing section is contiguous with the front half of the axial load bearing section. The front and rear halves of the axial load bearing section define a rectilinear configuration. The outer wall includes the front section inclined such that the cross-sectional area of the frame body decreases, the first valley, the center section, the crest, the rear section, and the second valley. This arrangement has the advantage that, when the vehicle receives a head-on impact (load), the front side frame crumples at the first valley, the crest, and the second valley (the zone immediately in front of where the box member is located) and undergoes folding deflection so as to be pushed toward the outside of the vehicle. Specifically, impact force can be cushioned through reliable folding at locations where the fold sections have been established.

Also, since the bulkhead couples the front half of the axial load bearing section to the rear half of the axial load bearing section, and is joined to the center section of the outer wall opposing this coupled zone, the through-thickness of the part of the outer wall where the bulkhead is joined is greater by the equivalent of the added thickness of the bulkhead. As a result, when a head-on impact force is borne by the vehicle, the impact force becomes concentrated in the vicinity of the joined section of the outer wall to which the bulkhead is joined, thereby facilitating bending in the form of an inverted-V-shape.

Further, when a head-on impact force is borne by the vehicle, the impact force is delivered from the inner wall (the front half of the axial load bearing section) of the front side frame to the outer wall via the bulkhead. As a result, the load bears outwardly from the inner wall toward the outer wall, whereby the crest of the front side frame readily undergoes folding in the form of an inverted-V-shape in relation to a desired load.

Because the first and second valleys are formed by depressing the outer wall, a greater concentration of force (stress) arises in the first and second valleys. Consequently, folding deflection of the front side frame in relation to a desired impact force takes place more easily.

DESCRIPTION OF EMBODIMENTS

A preferred embodiment of the present invention is described below with reference to the attached drawings.

Embodiment

Figure 1:
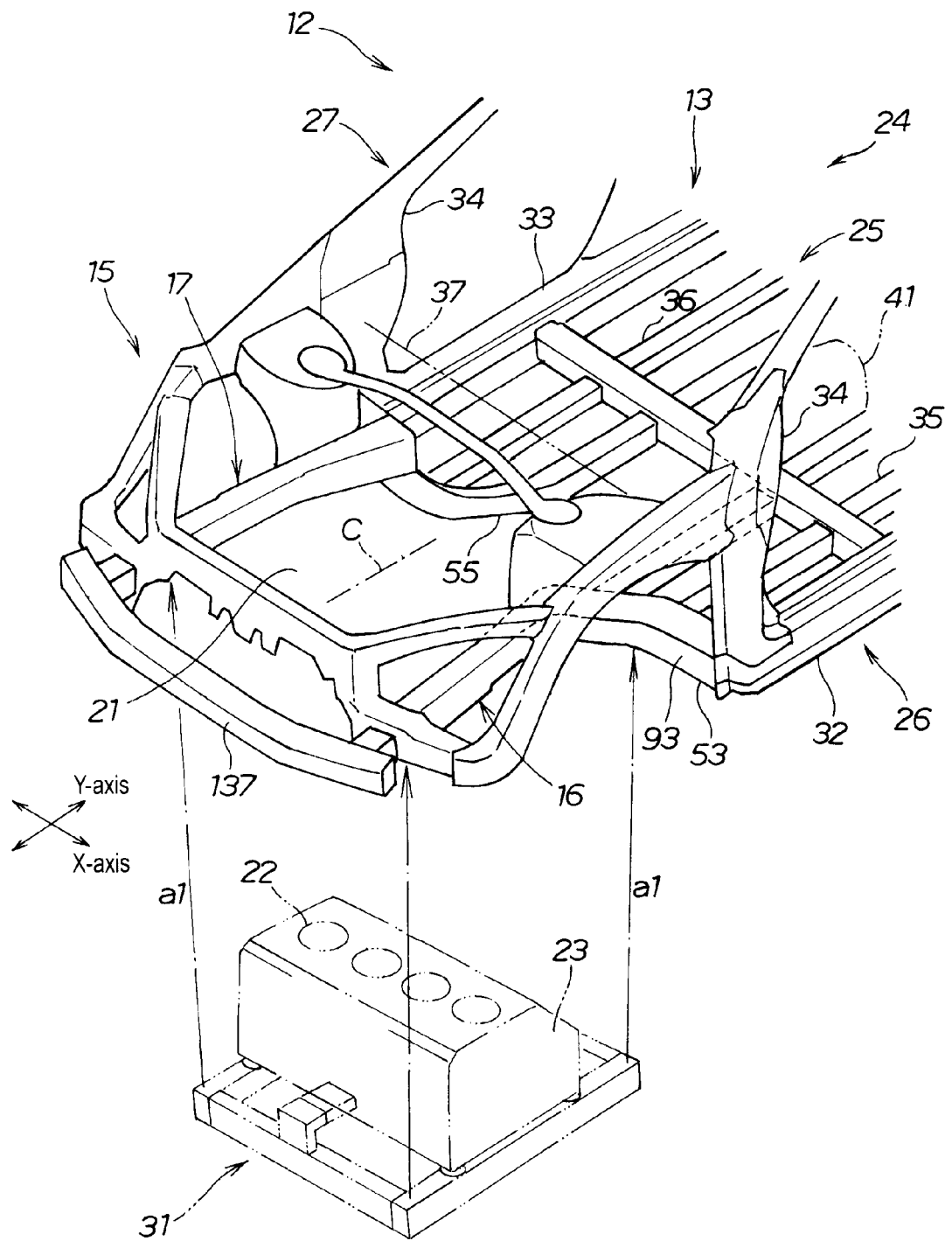
FIG. 1 is a perspective view of a vehicle body employing the vehicle body front structure according to an embodiment of the invention.

Referring to FIG. 1, a vehicle 12 is, for example, an FF (front engine, front drive) car which includes a vehicle body 13. An engine 22 and a transmission 23 are disposed in an engine compartment 21 located in a front body 15, and are supported on the vehicle body 13.

The vehicle body 13 comprises the front body 15; an underbody 25 composed of a floor panel; and left and right side bodies 26, 27. The front body 15 comprises the engine compartment 21, and left and right front side frames 16, 17 provided beneath the engine compartment 21. The engine 22 rests on a subframe 31, and the left and right front side frames 16, 17 are attached to the front body 15 from below as shown by arrows a1. The left and right front side frames 16, 17 are connected to the left and right side bodies 26, 27 respectively.

The left side body 26 comprises a left side sill 32 which continues from the left front side frame 16, and a left front pillar 34 which projects up from the front end of this side sill 32. The left side sill 32 constitutes [a part of] the underbody 25.

The right side body 27 comprises a right side sill 33 which continues from the right front side frame 17, and a right front pillar 34 which projects up from the front end of this side sill 33. The right side sill 33 constitutes a part of the underbody 25.

The underbody 25 comprises left and right floor frames 35, 36 which respectively continue from the left and right front side frames 16, 17; a dashboard 37 which segregates the engine compartment 21 and a passenger compartment 24; and a tunnel section 41 provided at the center.

The left and right front side frames 16, 17 are substantially symmetrical with reference to a centerline C in the widthwise direction of the vehicle, and therefore only the left front side frame 16 will be described here.

Figure 2:
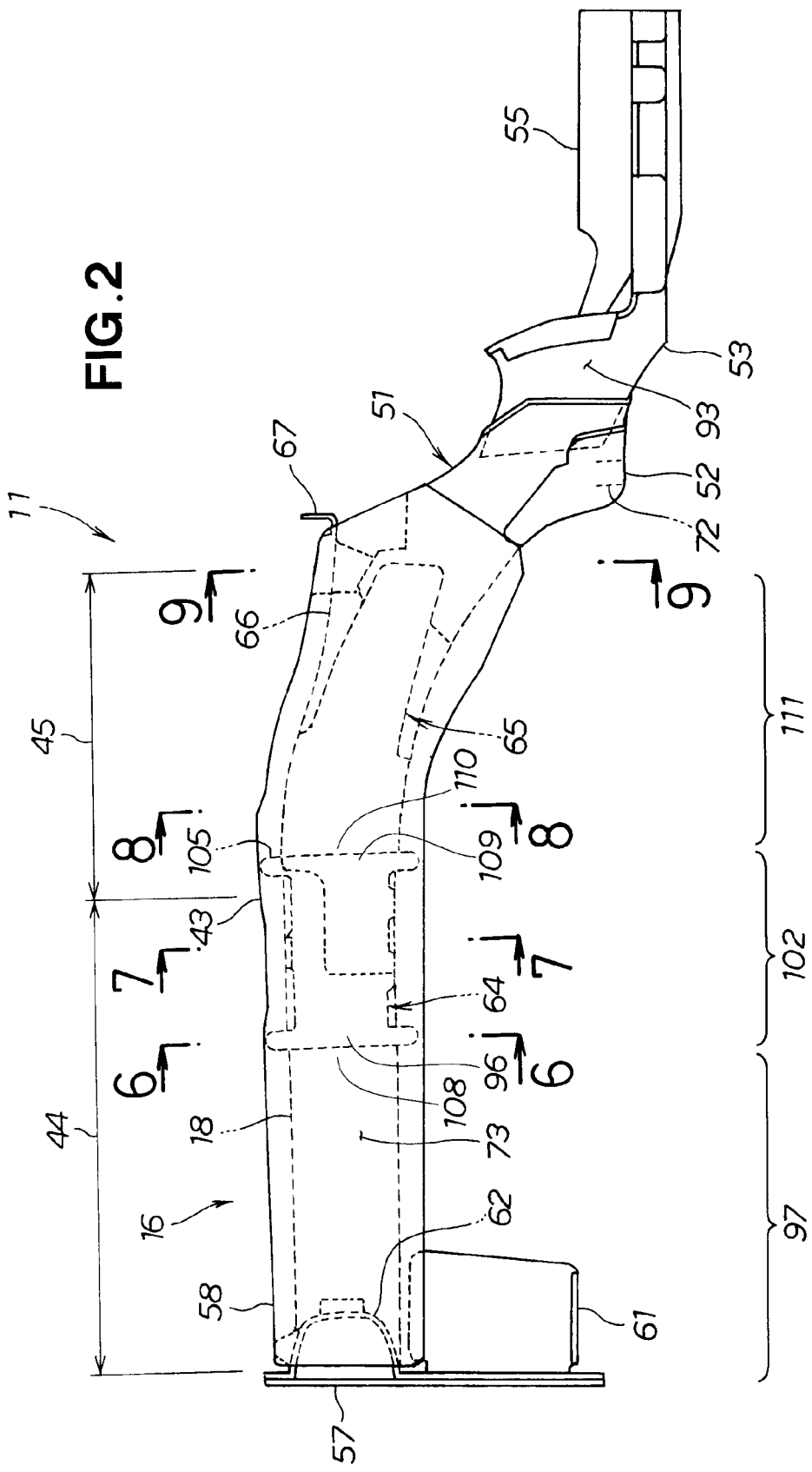
FIG. 2 is a side view of the left front side frame shown in FIG. 1.
Figure 3:
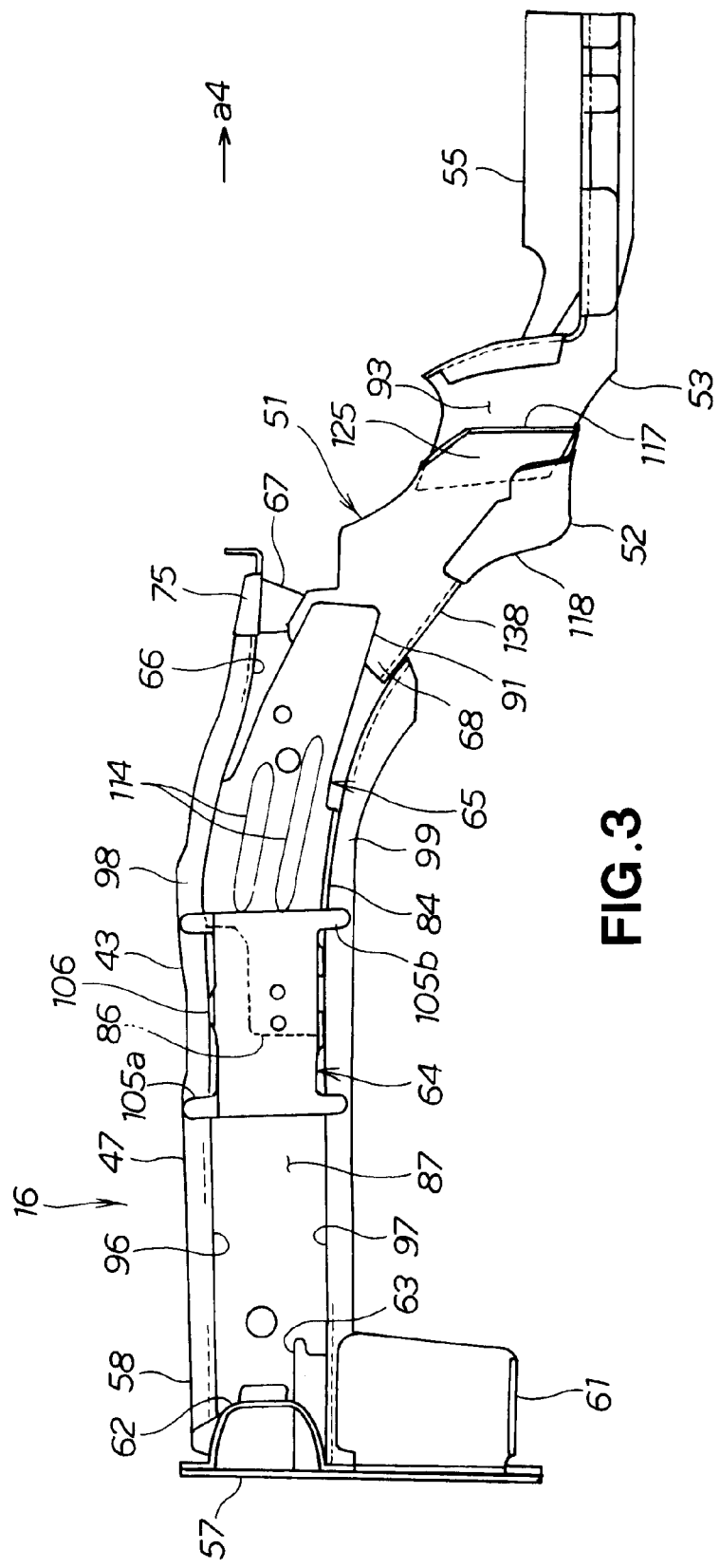
FIG. 3 is a side view with the outer wall of the front side frame shown in FIG. 2 removed.
Figure 4:
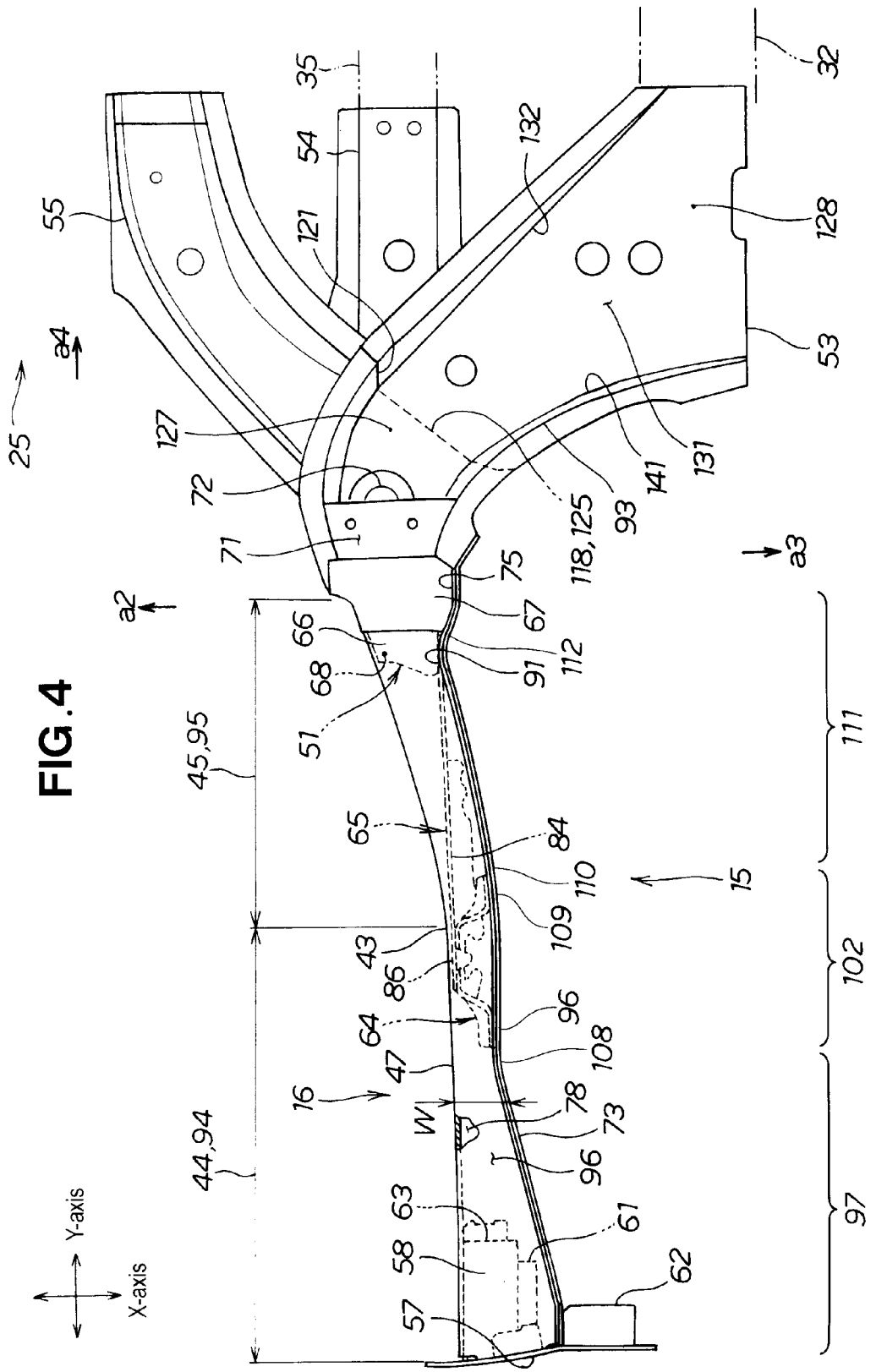
FIG. 4 is a plan view of the front side frame shown in FIG. 2.

As shown in FIGS. 2 to 4, in the left front side frame 16, a rear half (moment receiving section) 45 which extends toward the rear of the vehicle 12 from a center 43 curves toward the inside in the widthwise direction of the vehicle (the direction of arrow a2).

The front side frame 16 comprises a frame body 47 composed of a front half 44 (hereinafter referred to as "front half frame section") and the rear half 45 (hereinafter referred to as "rear half frame section"); a rear end frame 51 which continues from the frame body 47; a subframe rear section mount section 52 provided at the rear end of the rear end frame 51; an outrigger 53 which extends from the rear end of the rear end frame 51 toward the outside in the widthwise direction of the vehicle (the direction of arrow a3); a floor frame front section 54 (FIG. 4) which extends rearward in the longitudinal direction of the vehicle body (the direction of arrow a4) from the rear end of the rear end frame 51; and a tunnel frame 55 which extends inward in the widthwise direction of the vehicle (the direction of arrow a2) from the rear end of the rear end frame 51.

The front side frame 16 also comprises a front end panel 57 provided so as to provide closure at a distal end of the frame body 18; a subframe front section mount section 61 suspended from a frame front end section 58 of the frame body 18; a subframe support 62 extending outward in the widthwise direction of the vehicle (the direction of arrow a3) from the frame front end section 58 of the frame body 18; a front subframe bracket 63 provided inside the frame front end section 58 of the frame body 18; a bulkhead (center bulkhead) 64 provided inside the center 43 of the frame body 18; and a stiffener 65.

The front side frame 16 further comprises a coupling member 67 which is joined to a rear end 66 of the frame body 18, as well as being joined to the rear end frame 51; a rear section bulkhead 71 provided inside a rear end front section 68 of the rear end frame 51; and a rear subframe bracket 72 which is provided inside a rear section of the rear end frame 51 and joined to the subframe rear section mount section 52.

Figure 9:
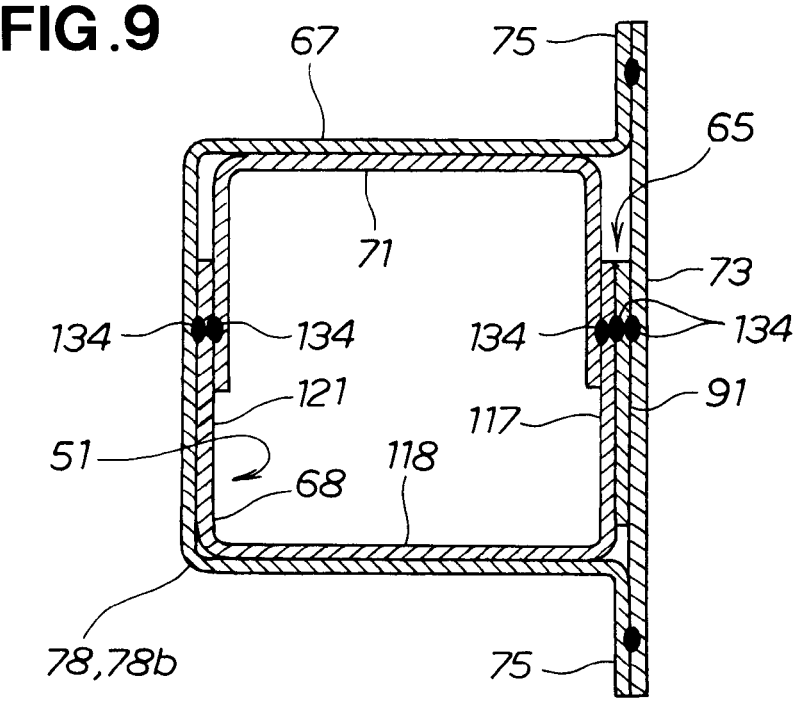
FIG. 9 is an enlarged sectional view taken along line 9-9 of FIG. 2.

A lower dashboard (not shown in the drawing), which is located at the lower end of the dashboard 37 contiguously with the tunnel section 41, is coupled to the coupling member 67. This lower dashboard is contiguous with the tunnel section 41. As shown in FIG. 9, the coupling member 67 has been given a U-shaped cross section, with the opening of the coupling member 67 facing outside in the widthwise direction of the vehicle and provided closure by an outer wall (cover member) 73.

Next, the vehicle body front structure will be described with FIGS. 1 to 9. FIG. 3 shows a state with the outer wall 73 removed.

The vehicle body front structure has the front side frames 16, 17, which are included in the front body 15 extending forward from the floor (the underbody 25) of the passenger compartment 24. The front side frame 16 has a closed cross-sectional shape, and in plan view of the vehicle 12 (the point of view of FIG. 4) comprises a rectilinear section (front half frame section 44) formed rectilinearly from the frame front end section 58 to the center 43 of the frame body; a moment receiving section (rear half frame section 45) continuing from the rectilinear section 44 and extending in a curved form toward the inside of the vehicle 12; a first ridge forming a corner 78 which, among corners 77, 78, 81, 82 of the rectilinear section 44 is one facing the inside of the vehicle 12 (the direction of arrow a2); and a stiffener 65 having a second ridge 84 coupled rectilinearly with the first ridge 78 inside the moment receiving section 45, and connecting to the rear end 66 of the front side frame 16.

Figure 7:
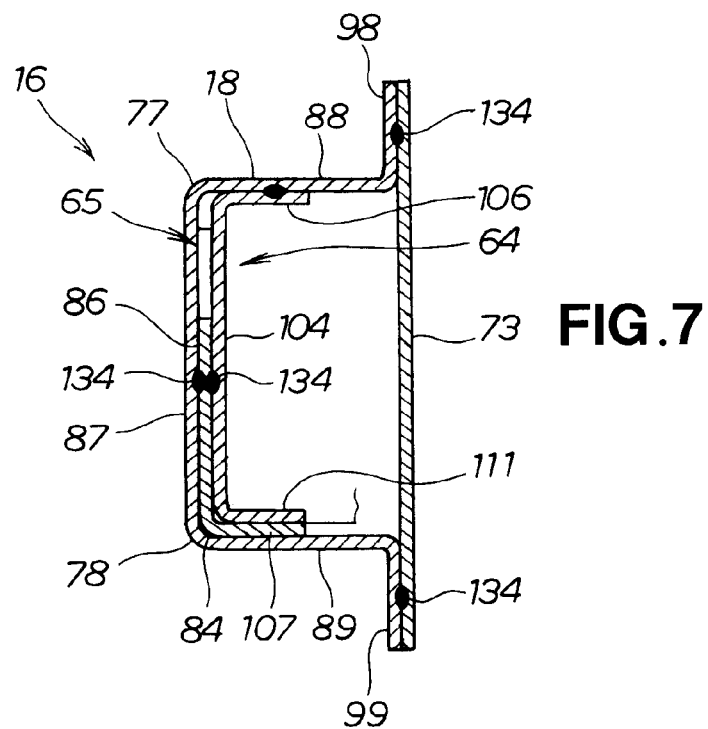
FIG. 7 is an enlarged sectional view taken along line 7-7 of FIG. 2.

The second ridge 84 is coupled to the first ridge 78 by joining a front section 86 of the stiffener 65 and the bulkhead (center bulkhead) 64 which is provided inside the front side frame 16. In more detail, as shown in FIG. 7, the front section 86 of the stiffener 65 is interleaved between the bulkhead (center bulkhead) 64 and the inner wall 87 of the frame body 18, and joined to the inner wall 87 and the bulkhead (center bulkhead) 64.

The first and second ridges 78, 84 are established at the bottom, in opposition to the inner side of the vehicle 12. A rear section 91 of the stiffener 65 continues into an outer wall section 93 which faces toward the outside in the widthwise direction of the vehicle (the direction of arrow a3), as shown in FIG. 4, within the respective outrigger 53 coupled to the left or right side sill 32, 33 that forms the left or right end of the floor of the passenger compartment 24.

Next, the frame body 18 will be described in detail with FIG. 3, FIG. 4, and FIGS. 6 to 8.

The frame body 18 has a rectangular U-shaped cross section formed with an upper lateral side section 88 and a lower lateral side section 89. The frame body 18 is disposed such that the opening of the frame body 18 having the U-shaped cross section faces toward the outside in the widthwise direction of the vehicle (the direction of arrow a3). The inner wall 87 faces toward the center of the engine compartment 21 (FIG. 1); the upper wall 88 and the lower wall 89 are formed contiguously with the inner wall 87; a welding flange section 98 is formed contiguously with the upper wall 88; and a welding flange section 99 is formed contiguously with the lower wall 89.

An upper-section corner 77 formed by the inner wall 87 and the upper wall 88 defines an upper first ridge, and an upper third ridge 77b continuing from the upper first ridge 77 is established on the moment receiving section (the rear half frame section 44). A lower-section corner 78 formed by the inner wall 87 and the lower wall 89 constitutes a first lower ridge, and a lower third ridge 78b continuing from the lower first ridge 78 is established on the moment receiving section (the rear half frame section 45).

The frame body 18 is formed with an average width W with respect to the widthwise direction of the vehicle (direction of the X axis), with each of the upper first ridge 77 and the lower first ridge 78 formed vertically (the vertical direction of the vehicle (direction of the Z axis)), from the distal end to the center 43 in the lengthwise direction (direction of the Y axis). There is also a third ridge 78b continuing from the first ridge 78, and curved or inclined toward the inside of the vehicle 12 (the direction of arrow a2), from the center 43 to the rear end 66. The bulkhead (center bulkhead) 64 and the stiffener 65 are housed inside.

Thus, the frame body 18 is hollow (see FIG. 6), with the front half frame section 44 being rectilinear and the rear half frame section 45 formed to a curved form toward the inside in the widthwise direction of the vehicle, producing a dogleg form. The front side frame 16 comprises the inner wall 87 located to the inside in the widthwise direction of the vehicle, and the outer wall 73 opposing the inner wall 87.

The inner wall 87 is composed of a front half 94 defining a front half of an axial load bearing section of the frame body (FIG. 4) formed rectilinearly from the front end to the center of the bulkhead 64, and a rear half 95 contiguous with the front half 94 and extending in a curved form with respect to an extended line of the front half 94. It is noted that the front half 94 is hereinafter referred to as "front half axial load bearing section" and the rear half 95 is hereinafter referred to as "rear half inner wall section"

The front section 86 at a first end of the stiffener 65 is connected to the front half axial load bearing section 94 and to the center of the bulkhead 64, and extends rectilinearly in substantially alignment with the extended line of the front half axial load bearing section 94; and the rear section 91 at the other end of the stiffener 65 is connected to the rear end of the outer wall 73, whereby the stiffener 65 defines a rear half of the axial load bearing section of the frame body continuing rectilinearly from the front half axial load bearing section 94. It is noted that the rear half of the axial load bearing section of the frame body is hereinafter referred to as "rear half axial load bearing section"

The outer wall 73 induces threefold inflection of the front side frame 16 together with the outer wall 73. In the outer wall 73, a front section 97 (hereinafter referred to as "front outer wall section") (FIG. 4) is formed on an incline such that the frame body 18 also has a diminishing cross-sectional area toward a front bulkhead-connected portion 96 which connects with a projecting piece 105a at one end portion of the bulkhead 64, and a first valley 108 is formed in the rear section of the front outer wall section 97.

The front outer wall section 97 is formed on an incline along the front half frame section 44 which has been formed such that the width W of the front side frame 16 reaches a minimum in the zone of the first valley 108.

The center section 102 of the outer wall 73 is formed from the first valley 108 to a rear bulkhead-connected portion 109 where a projecting piece 105b at the opposite end portion of the bulkhead 64 connects to the outer wall 73. A crest 110 is formed in the rear portion of the center section 102. A rear section 111 of the outer wall 73 (hereinafter referred to as "rear outer wall section) which continues from the crest 110 is formed parallel to the rear half inner wall section 95, and a second valley 112 is formed at the rear end of the rear outer wall section 111. Specifically, the first valley 108 is formed at the boundary section of the front outer wall section 97 and the center section 102. The crest 110 is formed at the boundary section of the center section 102 and the rear outer wall section 111.

Next, the bulkhead 64 will be described in detail with FIGS. 5, 7, and 10, and the stiffener 65 with FIG. 5, FIGS. 7 to 9, and FIG. 11.

In the bulkhead 64, a bulk body 103 of panel form is formed with an arch form in plan view (the viewpoint of FIGS. 4 and 5); a center arch section 104 is formed in the center of the bulk body 103; projecting pieces 105a, 105b of elliptical form adapted to be linked by being interleaved between the outer wall 73 and the welding flange sections 98, 99 provided to the opening of the frame body 18 are formed at either end of the bulk body 103; an upper joining piece section 106 is formed on the upper edge at the center of the bulk body 103 so as to join with the upper wall 88; and a welding allowance section 111 adapted to be joined overlapping a welding allowance section 107 of the stiffener 65 is formed contiguously below the bulk body 103.

The front section 86 of the stiffener 65 is interleaved between the center arch section 104 and the inner wall 87 of the frame body 18, and secured by welding.

As described previously, the stiffener 65, with the front section 86 thereof joined to the bulkhead 64, is positioned with the second ridge 84 along the first ridge 78 below the front side frame 16. The second ridge 84 is then disposed so that the first ridge 78 is extended by the second ridge 84.

The stiffener 65 has a stiffener body 113 formed rectilinearly to extend in the form of a panel from the center 43 of the frame body 18 to the rear end 66 of the frame body 18, with the welding allowance section 107 formed at the bottom from the front section 86 to the center of the stiffener body 113, and with a second ridge 84 formed by the stiffener body 113 and the welding allowance section 107. Specifically, the second ridge 84 is a corner section.

In the stiffener body 113, a groove section 114 is formed along the lengthwise direction of the front side frame 16. By forming the groove section 114, the strength of the stiffener 65 can be enhanced with respect to a compressive load transmitted to the stiffener 65 from the center 43 of the front side frame 16.

The second ridge 84 is absent from the center of the stiffener body 113 to the rear section 91 of the stiffener body 113, and the stiffener 65 inclines obliquely downward toward the floor of the passenger compartment 24. The rear section 91 of the stiffener body 113 is joined to the rear end frame 51, and continues into the outer wall section 93 of the outrigger 53 (see FIG. 4) via the rear end frame 51.

As shown in FIGS. 3, 5, 9, and 13, the rear end frame 51 is formed to a U-shaped cross section having a rear end bottom section 118 formed contiguously with a rear end outer peripheral section 117 which faces toward the outside of the vehicle 12, and a rear end inside peripheral section 121 contiguous with the rear end bottom section 118, and formed opposing the rear end outer peripheral section 117.

The rear end bottom section 118 is provided with a subframe rear section mount section 52, the inside face of the subframe rear section mount section 52 being provided with a rear subframe bracket 72 (FIG. 4) for tightening purposes. The rear section bulkhead 71 (see FIG. 4 as well) located above the rear subframe bracket 72 is attached to the rear end front section 68 of the rear end frame 51.

As shown in FIGS. 3, 4, and 9, the rear end front section 68 of the rear end frame 51 is joined to the rear end 66 of the frame body 18, and the coupling member 67 is joined overlapping the outside face of the rear end front section 68. Further, as shown in FIGS. 3 and 4, the rear end frame 51 joins to the outrigger 53 at a rear end rear section 125.

Figure 13:
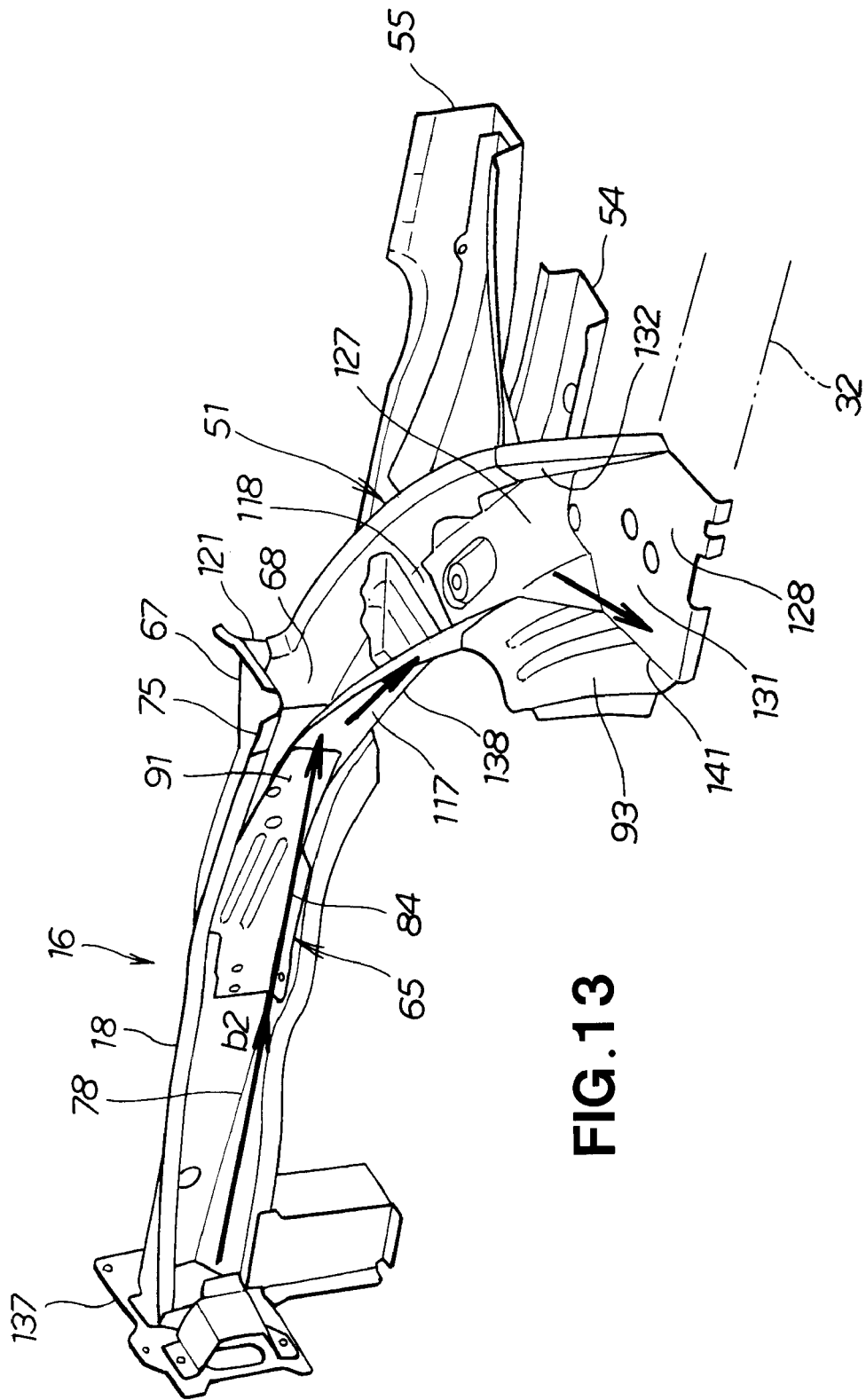
FIG. 13 is a perspective view showing a state of transmission of load to a front side frame.

The outrigger 53 is formed with a dogleg form, and has an integrally extending inner end section 127 formed joined with the rear end frame 51, and an outer end section 128 contiguous with the inner end section 127, and which extends outwardly in the widthwise direction of the vehicle to join with the side sill 32. As shown in FIGS. 4 and 13, the outrigger 53 has formed therein an outer wall section 93 of groove form located to the outside in the widthwise direction of the vehicle, with an outrigger bottom section 131 formed contiguously with the outer wall section 93, and an inner wall section 132 formed contiguously with the outrigger bottom section 131 and located to the inside in the widthwise direction of the vehicle.

Next, a brief overview of the assembly of the front side frame 16 will be described.

Figure 5:
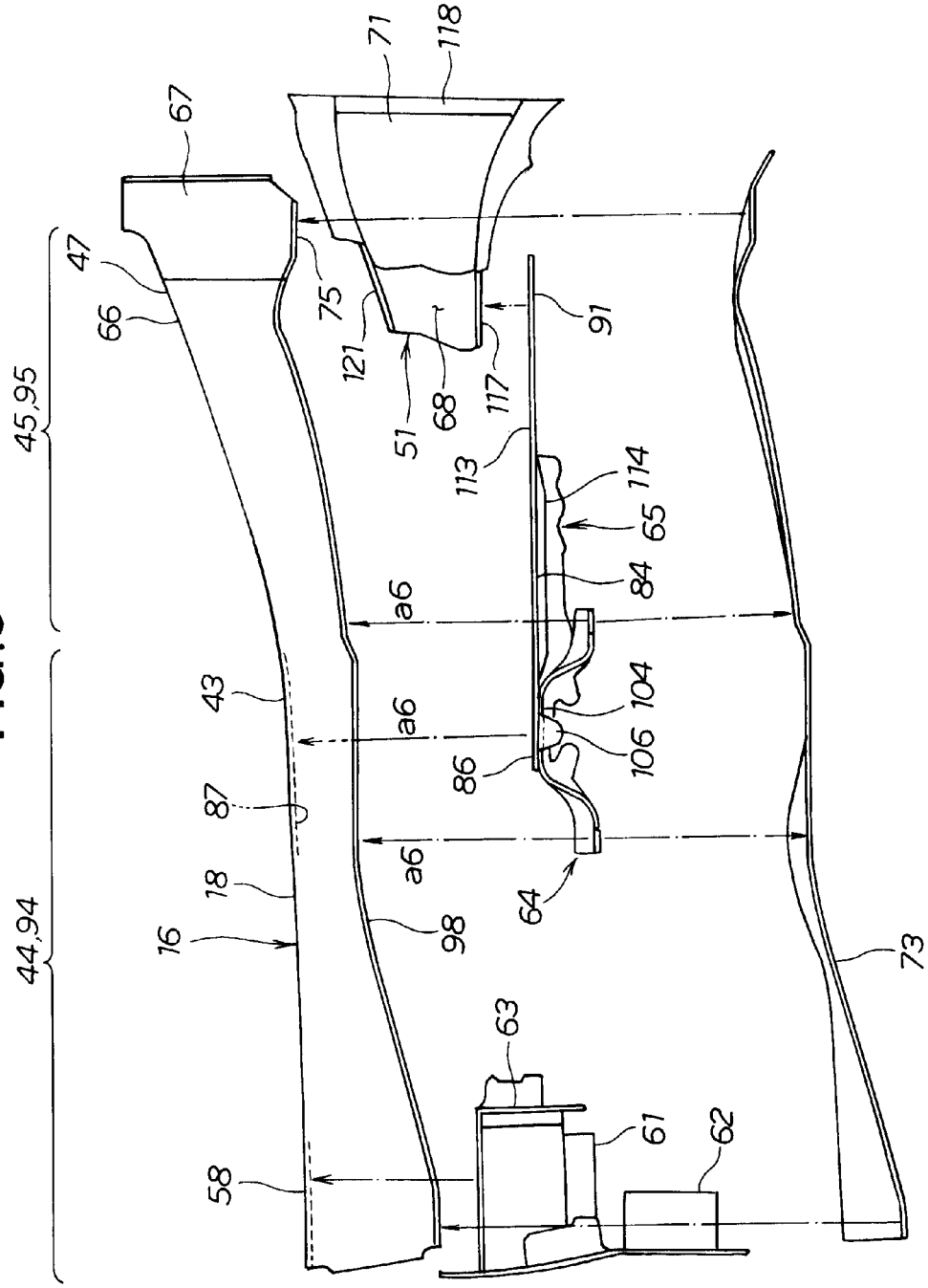
FIG. 5 is an exploded view of the front side frame shown in FIG. 4.

First, the stiffener 65 and the bulkhead (center bulkhead) 64 to be secured inside the front side frame 16 shown in FIG. 5 are linked. The front section 86 of the stiffener 65 is joined overlapping the center arch section 104 of the bulkhead 64 (see FIG. 6).

Next, the rear section 91 of the stiffener 65 is joined overlapping the rear end outer peripheral section 117 in the rear end front section 68 of the rear end frame 51. At this time, welding edge sections of the rear section bulkhead 71 are joined overlapping the rear end frame 51 (see FIG. 9).

The bulkhead 64, the stiffener 65, the rear end frame 51, and the rear section bulkhead 71 are inserted inside the frame body 18 from the opening of the frame body 18 as shown by arrow a6, and are joined overlapping the inside face of the inner wall 87 (see FIG. 7), as well as being joined overlapping the inside face of the lower wall 89 (see FIGS. 7, 8). [Reference symbols] 134 denote welded sections.

Figure 6:
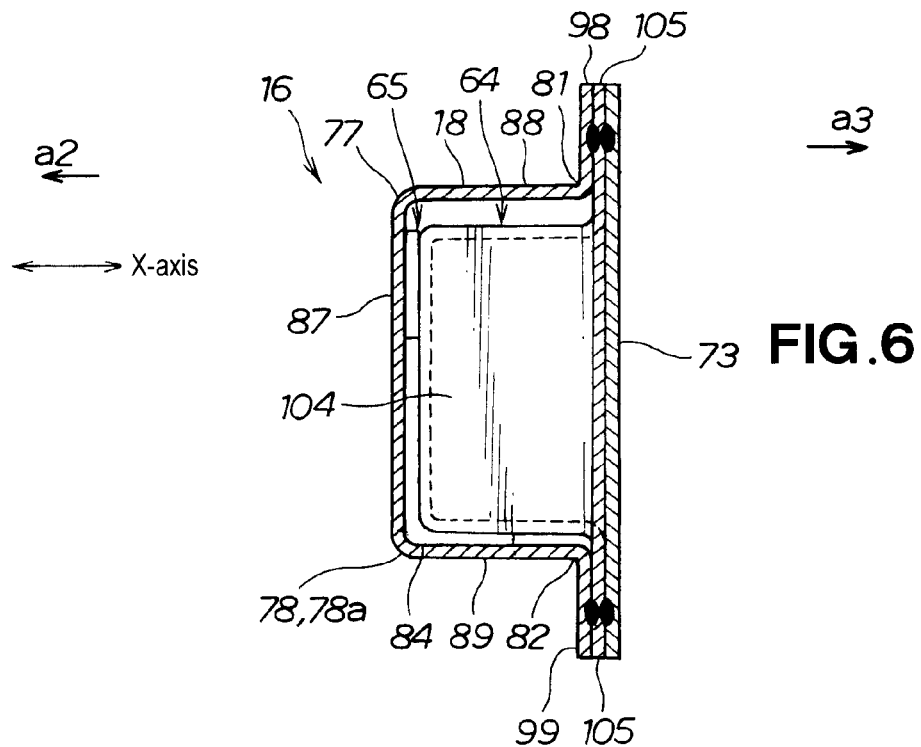
FIG. 6 is an enlarged sectional view taken along line 6-6 of FIG. 2.
Figure 8:
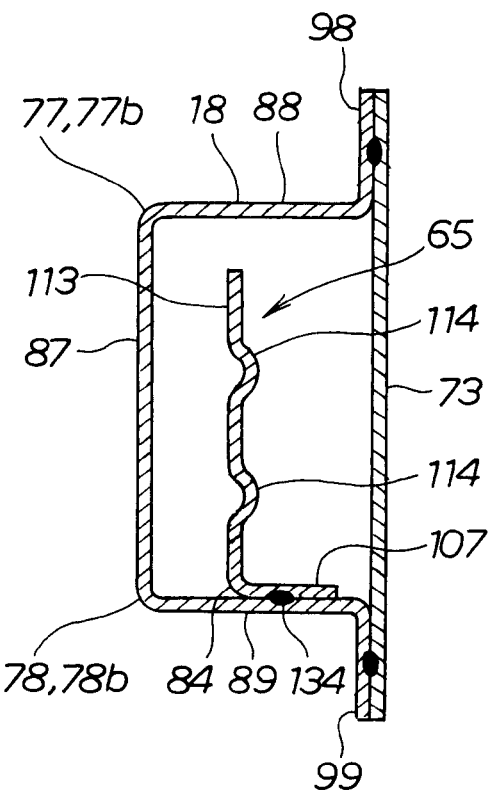
FIG. 8 is an enlarged sectional view taken along line 8-8 of FIG. 2.

Last, the outer wall 73 is joined overlapping the welding flange sections 98, 99 of the frame body 18 (see FIGS. 6 to 8). Specifically, as shown in FIG. 6, the outer wall 73 is overlappingly joined to the projecting pieces 105a, 105b of the bulkhead (center bulkhead) 64 already overlapping the welding flange sections 98, 99; and, as shown in FIG. 9, the outer wall 73 is overlappingly joined to a welding flange 75 of the coupling member 67.

Figure 12:
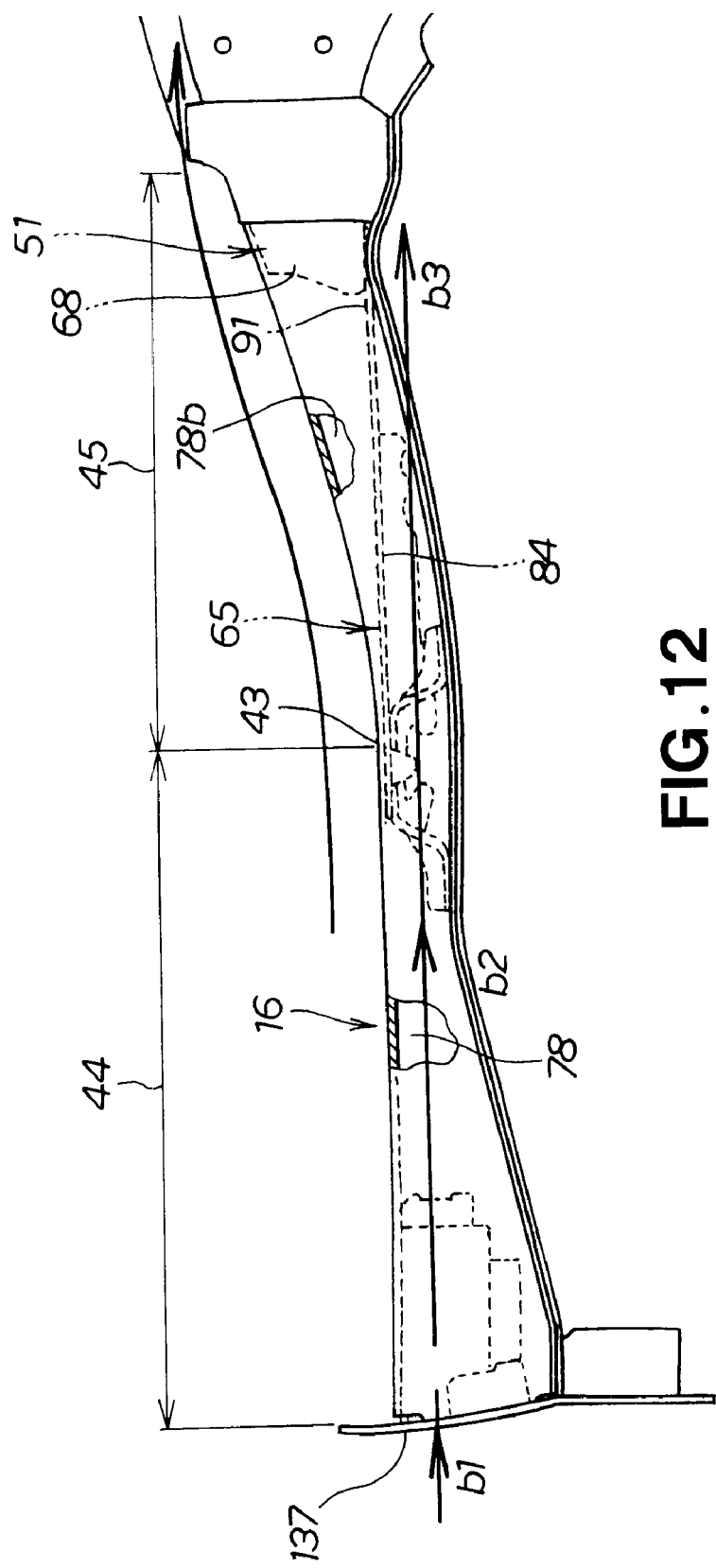
FIG. 12 is a view showing a state of transmission of load to a front side frame.

Next, the operation of the vehicle body front structure according to the embodiment will be described with FIGS. 1, 12, and 13.

In the vehicle body front structure, when a load is input in the manner shown by arrow b1 to a bumper beam 137 (front end panel 57) of the vehicle 12, because the front side frame 16 primarily delivers the load from the lower first ridge 78 to the second ridge 84 of the stiffener 65 in the manner shown by arrow b2, desired strength can be ensured despite the curved form of the front side frame 16, and the efficiency with which the load is delivered to the side sill 32 can be improved.

Specifically, when a compressive load bears on the distal end of the front side frame 16 in a head-on collision (offset collision), the front half frame section 44 of the front side frame 16 disperses the load from the center 43 of the front side frame 16 into a load delivered to the rear half frame section 45 of the front side frame 16 and a load delivered to the stiffener 65; therefore, the stiffener 65 delivers the load from the rear section 91 to the rear end frame 51. At this time, the load is delivered to the second ridge 84 of the stiffener 65 which continues from the lower first ridge 78 provided to the front half frame section 44 of the front side frame 16. Specifically, as shown in FIG. 12, the load is delivered to the rear end front section 68 of the rear end frame 51 in the manner shown by arrow b3, so as to be delivered on a rectilinear axis. Consequently, the efficiency of load transmission is good.

Further, the load delivered to the rear end front section 68 of the rear end frame 51 is delivered primarily to a corner (ridge line section) 138 formed by the rear end outer peripheral section 117 and the rear end bottom section 118 in the rear end front section 68, then delivered from this corner (ridge line section) 138 to a corner (ridge line section) 141 formed by the outer wall section 93 and the outrigger bottom section 131 of the outrigger 53, and transmitted to the side sill 32; therefore, the distance to reach the side sill 32 is shorter as compared with cases in which most of the load has been transmitted to the remaining zones, and thus the efficiency of load transmission is better.

A load delivered from the bottom first ridge 78 to the rear half frame section 45 of the front side frame 16 is primarily dispersed by the bottom third ridge line section 78b.

The frame body 18 of the front side frame 16 integrally curves from the center 43; it can be obtained in a single pressing task, and plastic working is readily performed. Also, the frame body 18 of the front side frame 16 integrally curves from the center 43; and handling between steps, i.e., conveyance, storage, organization, transport, and the like, is facilitated.

Further, the frame body 18 of the front side frame 16 integrally curves from the center 43, and assembly is facilitated.

Here, molding of the frame body 18 of the front side frame 16 will be described briefly (but not shown in the drawings).

First, a press-molding die, and material for molding cut from a steel plate, are prepared.

The die has one stationary die, and another movable die which is opposed to this stationary die. The stationary die is engraved with a groove-shaped concave form of substantially constant depth corresponding to the width W of the frame body 18. On the moveable die is formed a convex form corresponding to the concave form.

Next, after attaching the moveable die and the stationary die to a press machine, the material for molding is set on the stationary die, and then the movable die is moved (lowered) to bring about plastic working of the material for molding and obtain a primary finished article of the frame body 18. The primary finished article is then worked in downstream steps to finish the frame body 18.

In this way, for the front side frame 16, the die may be worked by cutting or grinding to produce a groove-shaped concave form engraved to substantially constant depth (corresponding to the width W). A resultant advantage is that the manufacture of die concave/convex forms is easier than, for example, a die in which the depth of the groove-shaped concave form is less to one side and greater to the other, in other words, one in which the bottom of the groove is inclined.

Figure 14:
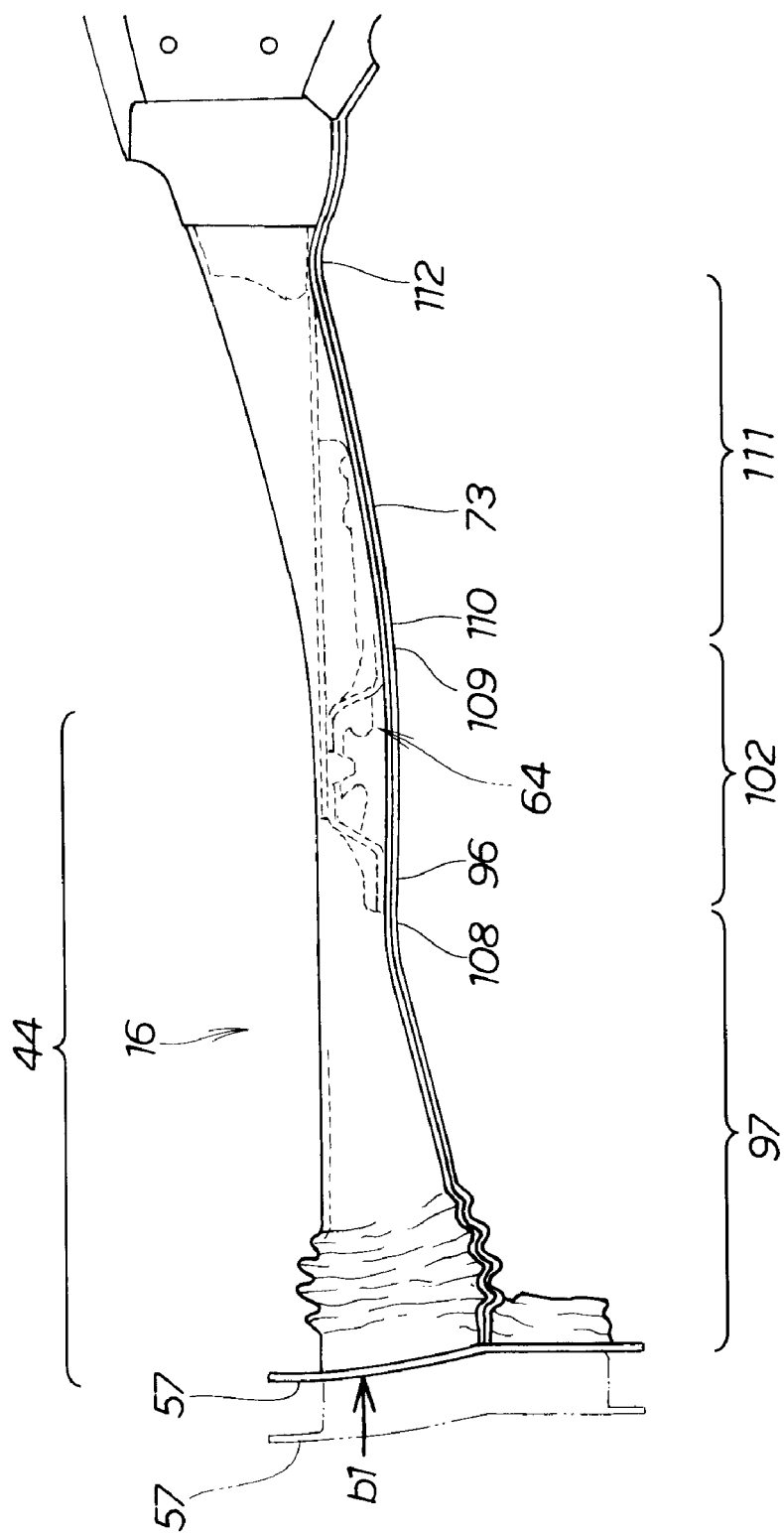
FIG. 14 is a view showing a state of crumpling of a front half frame section of a front side frame when a vehicle has been involved in a collision.
Figure 15:
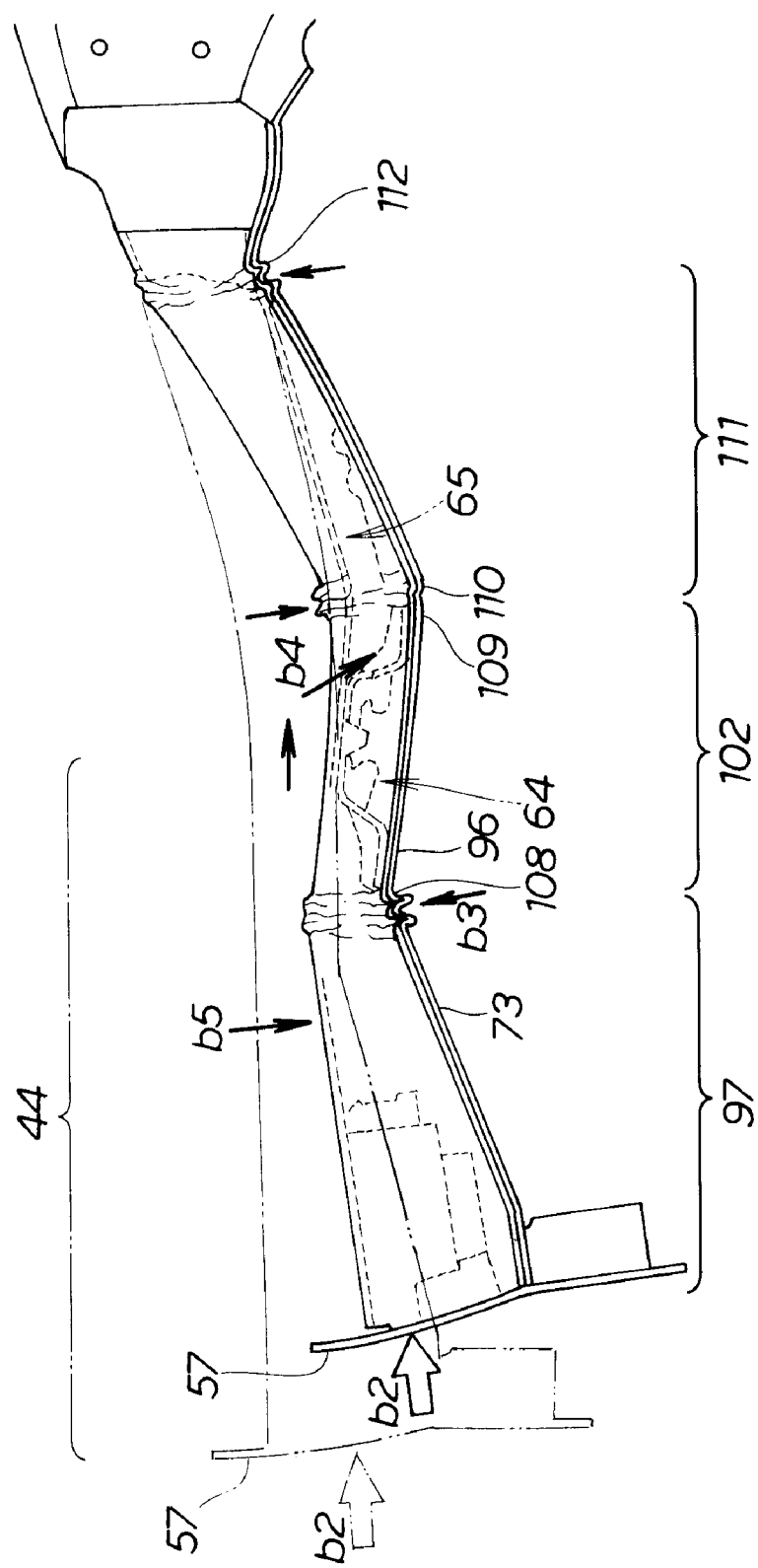
FIG. 15 is a view showing a state of folding deflection of a front side frame when a vehicle has been involved in a collision.

Next, a state in which impact load has operated on the vehicle body front structure according to the present embodiment is described based on FIGS. 14 and 15.

As shown in FIG. 14, a load input to the bumper beam 137 (FIG. 1) which is the front surface of the vehicle will be delivered to the front side frame 16 as shown by arrow b1. If the delivered load is small, the impact (load) is absorbed by the front side frame 16, through compressive deformation of the front half frame section 44 including the front outer wall section 97. When the impact load is small, the first valley 108, the crest 110, and the second valley 112 do not deform. Examples are when vehicle speed is low, or when an object has absorbed the impact load.

When the load is large, and particularly under conditions of an offset collision, when the load is delivered to the front side frame 16 as shown by arrow b2, the first valley 108, the crest 110, and the second valley 112 begin to experience folding deflection, and therefore the front side frame 16 experiences folding deflection into a Z shape as shown in FIG. 15, and the impact load is absorbed.

Specifically, because the first valley 108 experiences folding deflection so as to move closer to the inner wall 87, a concentration of load arises and gives rise to valley folding in the manner shown by arrow b3.

The crest 110 experiences folding toward the outside. At this time, the load is delivered from the front half frame section 44 to the bulkhead 64, where it is dispersed by the bulkhead 64 and delivered to the crest 110 of the outer wall 73 in the manner shown by arrow b4. As a result, the load can be concentrated at the crest 110, and mounting folding can be readily achieved, while the center of the front side frame 16 easily experiences folding deflection toward the outside in the widthwise direction of the vehicle.

In the curved rear half inner wall section 95, because the second valley 112 is formed in a V shape, it experiences valley folding as shown by arrow b5.

In this way, the front side frame 16 easily experiences folding deflection toward the outside in the widthwise direction of the vehicle as shown by arrow b6.

By juxtaposing and joining the bulkhead 64 to the outer wall 73 of the front side frame 16, portions of the outer wall 73 which correspond to the end sections of the bulkhead are easily folded, and the front side frame 16 readily experiences folding deflection. Specifically, in the outer wall 73, the through-thickness of the front bulkhead-connected portion 96 and the through-thickness of the rear bulkhead-connected portion 109 have substantial thickness, and the first valley 108 and the crest 110 readily fold in relation to a desired load.

Next, the right front side frame 17 will be described on the basis of FIGS. 16 to 24.

Figure 16:
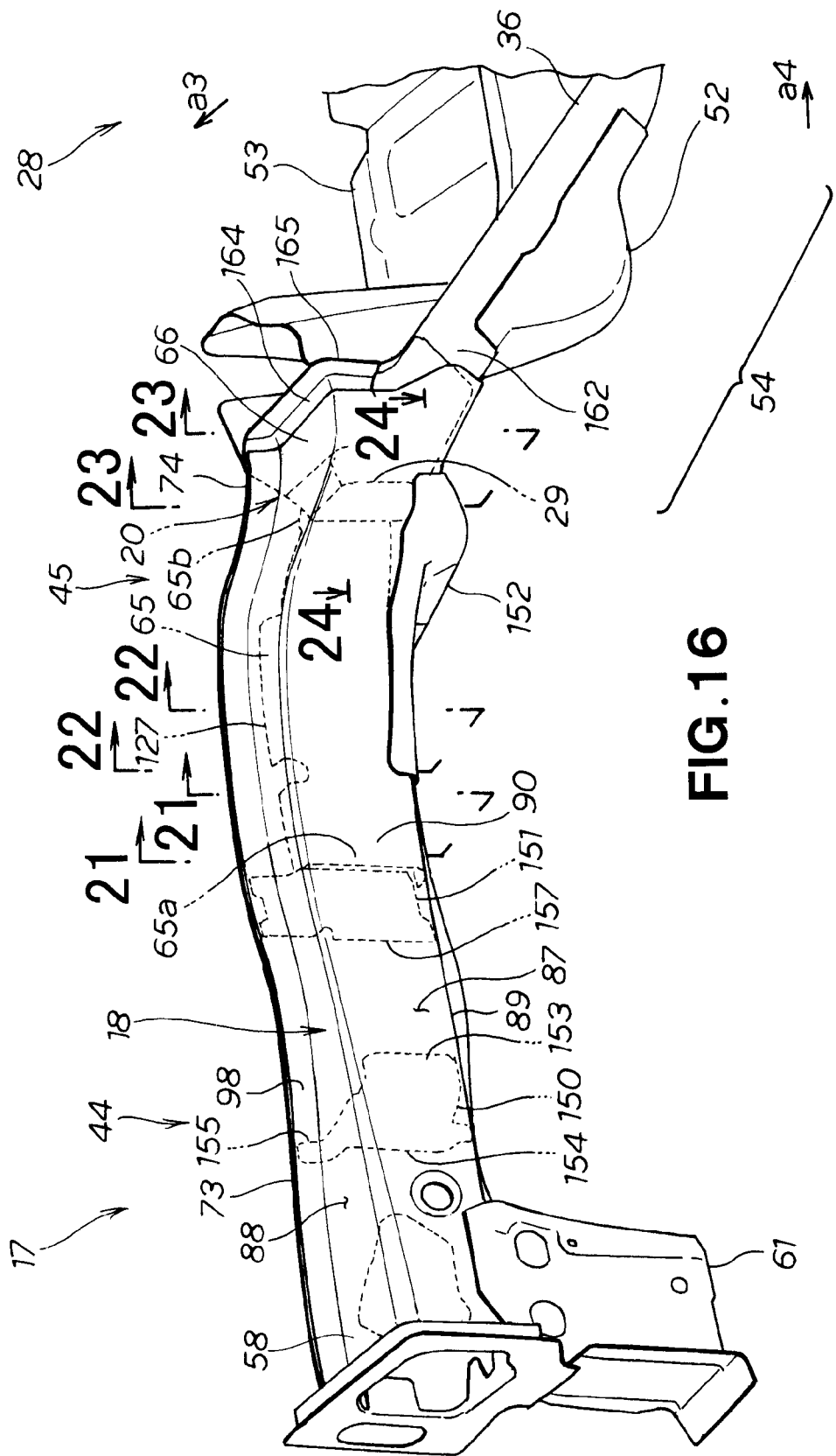
FIG. 16 is a perspective view of a right front side frame.

As shown in FIG. 16, using the box member 20, the left and right floor frames 35, 36 are joined to the rear end 66 of the frame body 18. The stiffener 65 is disposed within the rear half frame section 45 of the frame body 18. A front end 65a of the stiffener 65 is joined to a stiffener-joined section 90 which is located in the front section of the rear half frame section 45 in the inner wall 87. A rear end 65b of the stiffener 65 is joined to a rear end 74 of the outer wall 73.

Figure 17:
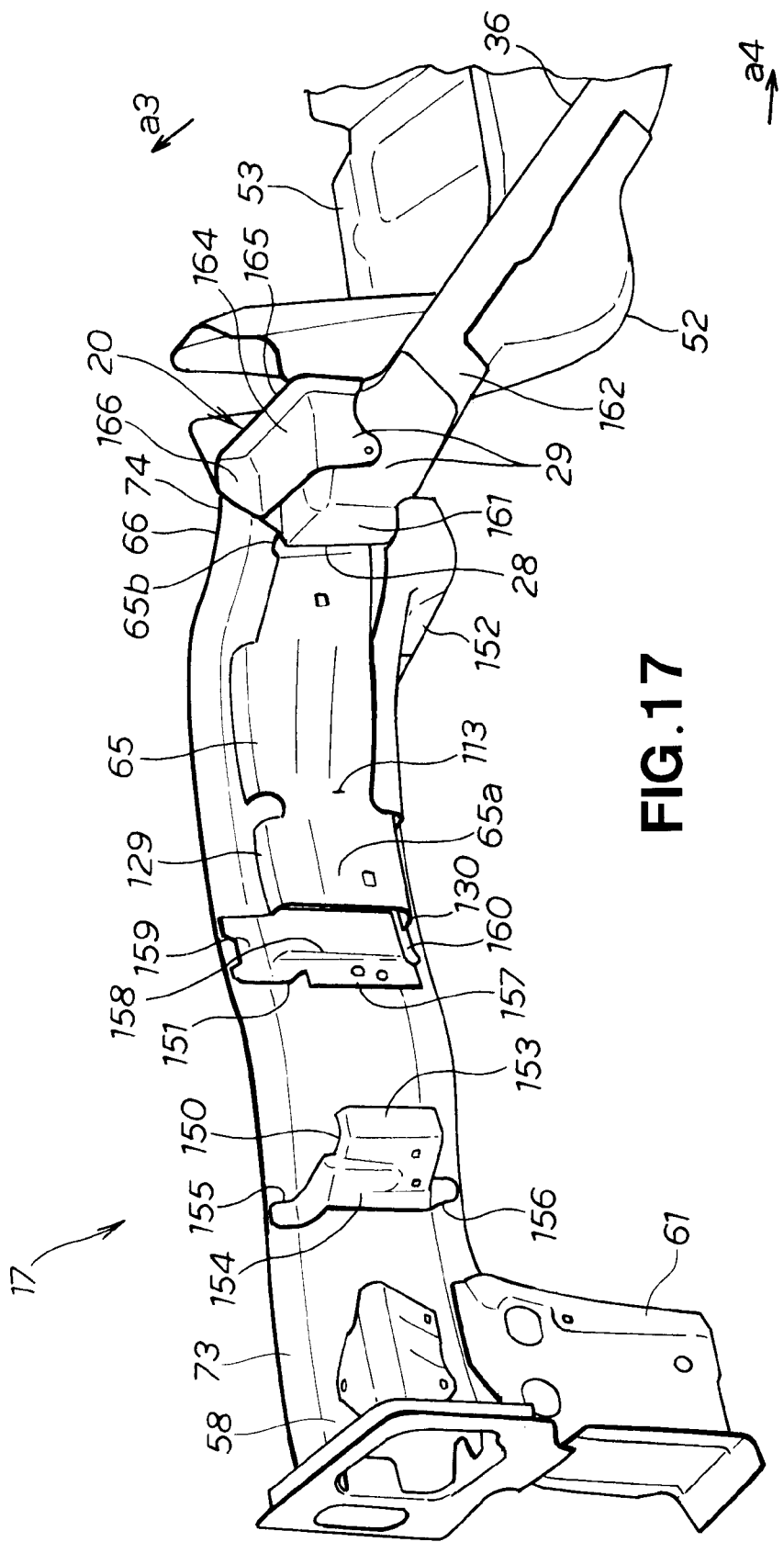
FIG. 17 is a perspective view with the outer wall removed from the front side frame shown in FIG. 16.
Figure 19:
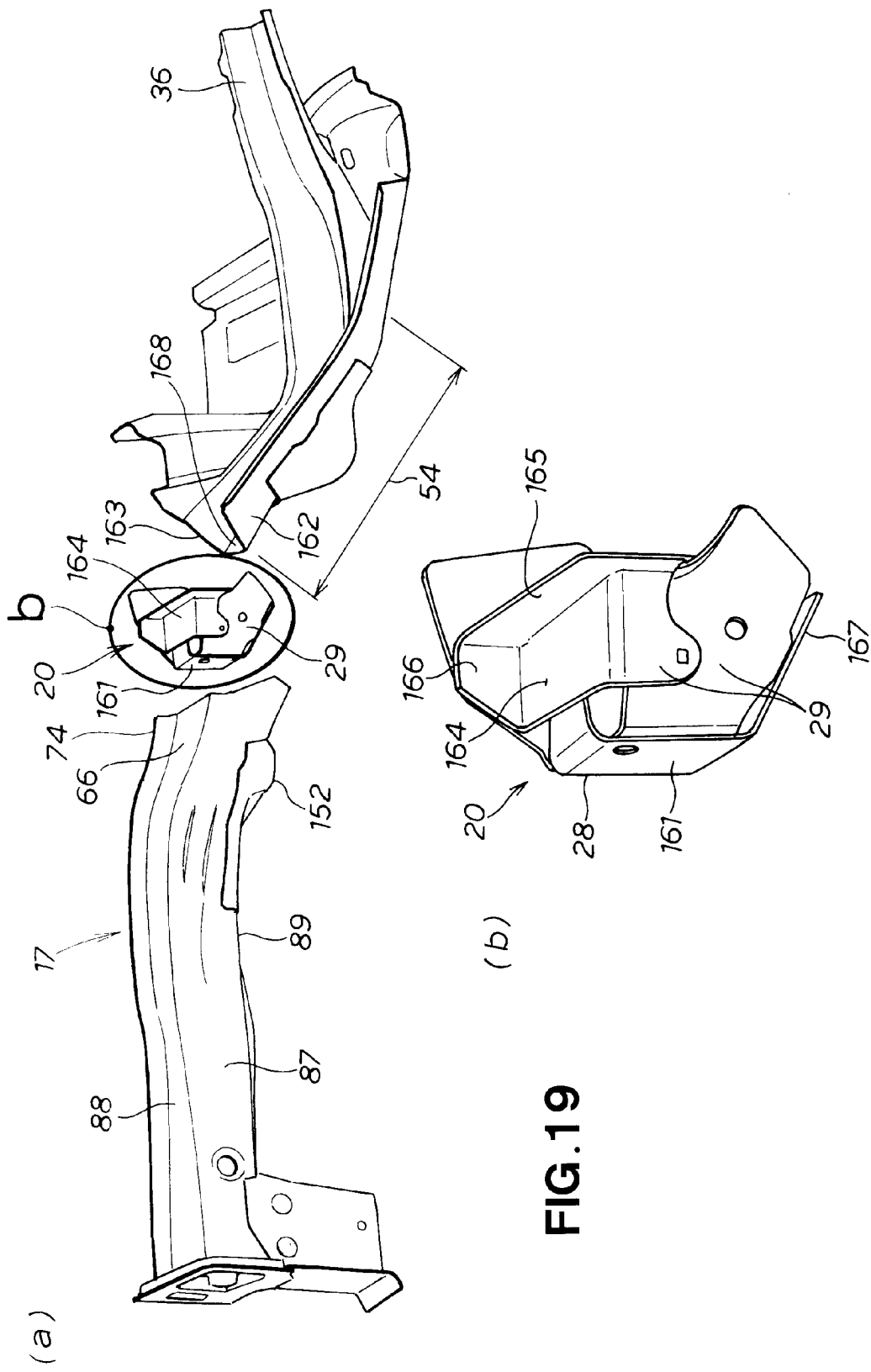
FIG. 19(a) is an exploded perspective view of the front side frame shown in FIG. 18.
FIG. 19(b) is a perspective view showing a box member of section b of FIG. 19(a)
Figure 20:
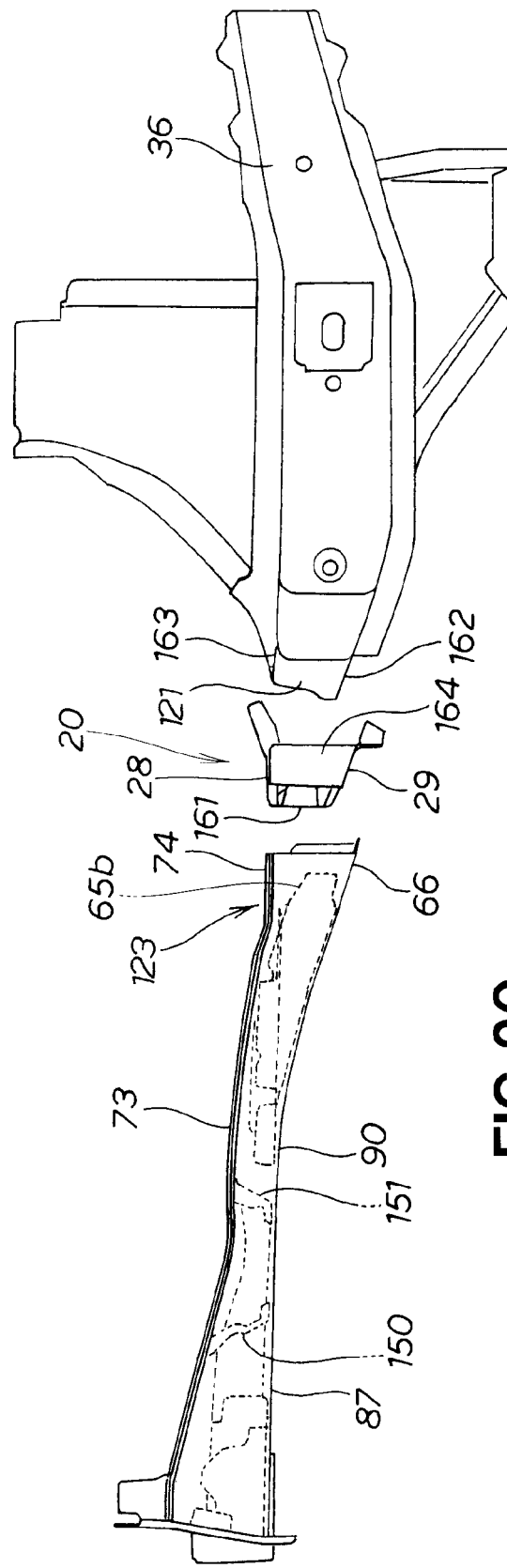
FIG. 20 is an exploded view of the front side frame shown in FIG. 18.

As shown in FIGS. 17 and 19, an outer section (outer coupling-side section) 28 of the box member 20 is joined to the rear end 65b of the stiffener 65, while an inner section (inner coupling-side section) 29 which opposes at least the outer coupling-side section 28 in the box member 20 is joined to the rear end 66.

An upper flange 129 and a lower flange 130 of the stiffener 65 are respectively joined to the upper wall 88 and the lower wall 89 which continue from the inner wall 87 and the outer wall 73 of the frame body 18 (FIG. 16).

Figure 18:
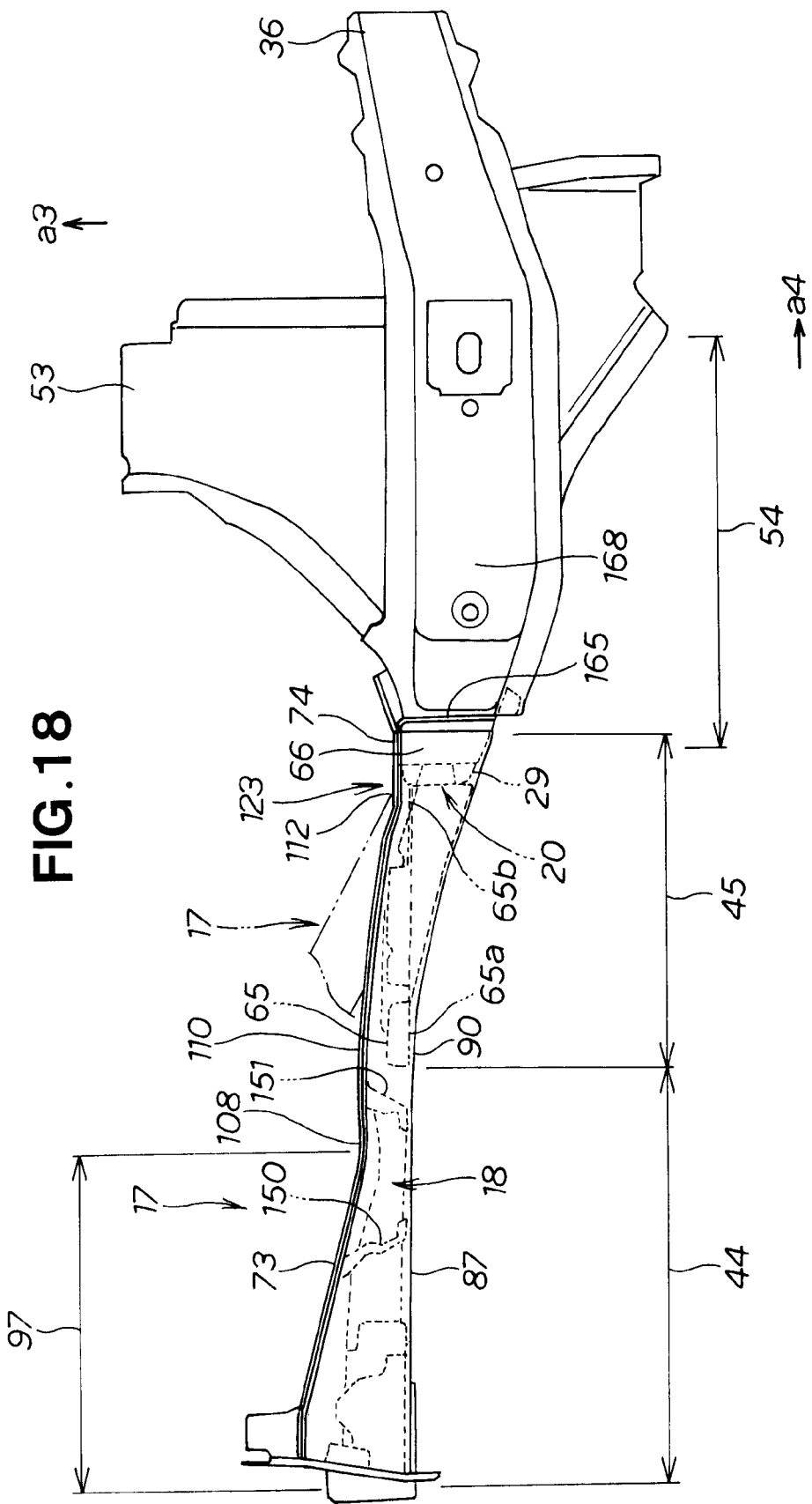
FIG. 18 is a plan view of the right front side frame shown in FIG. 16.

As shown in FIGS. 17 and 18, the right front side frame 17 is composed of a front half frame section 44 and a rear half frame section 45. The front side frame 17 comprises a subframe front section mount section 61 suspended from a frame front end 58.

The front side frame 17 comprises an engine-supporting first bracket 150, a second bracket 151, a stiffener 65, and a subframe center attachment section 152.

The floor frame 36 is provided with a subframe rear section mount section 52. An outrigger 53 extends to the outside in the widthwise direction of the vehicle from the floor frame 36, as shown by arrow a3.

Further, a floor frame front section 54 (FIG. 16, FIG. 19) extends toward the rear of the vehicle (arrow a4) from the box member 20.

Figure 21:
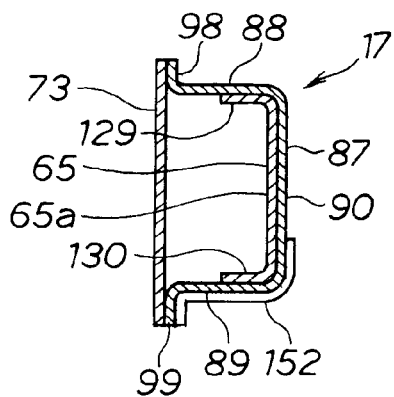
FIG. 21 is an enlarged sectional view taken along line 21-21 of FIG. 16.

Next, the frame body 18 of the front side frame 17 will be described. As shown in FIG. 21, the frame body 18 is formed to have a U-shaped cross section, and a rectangular closed cross section is formed by joining the outer wall 73 to the opening of the U shape.

The frame body 18 is formed by an inner wall 87, an upper wall 88, and a lower wall 89. The frame body 18 is disposed with the opening thereof facing outward in the widthwise direction of the vehicle as shown by arrow 3. A welding flange section 98 is formed contiguously with the upper wall 88, and the welding flange section 99 is formed contiguously with the lower wall 89.

As shown in FIG. 18, the outer wall 73 has a first valley 108, a crest 110, and a second valley 112 successively formed therein from the front section toward the rear. The first valley 108 is formed at a location slightly to the front from a center section of the front side frame 17 in the longitudinal direction. The front outer wall section 97 of the outer wall 73 is formed on an incline from the front end to the first valley 108. Specifically, the front outer wall section 97, by virtue of being inclined from the front end thereof toward the inner wall 87, inclines so as to give the front side frame 17 a diminishing cross-sectional area from the front end to the first valley 108.

Next, the engine-supporting first bracket 150 and the second bracket 151 are described on the basis of FIGS. 17 and 18.

The first bracket 150 is provided within the front half frame section 44 of the front side frame 17. The first bracket 150 has a first inner joining section 153 which is joined to the inner wall 87, and has a first partition section 154 formed contiguously with this first inner joining section 153.

On the first partition section 154 a first upper joining piece 155 is formed so as to be joined by interleaving between the upper wall 88 (the welding flange section 98) and the outer wall 73. Further, on the first partition section 154 a first lower joining piece 156 is formed so as to be joined by interleaving between the lower wall 89 (the welding flange section 99) and the outer wall 73.

The second bracket 151 has a second inner joining section 157 formed so as to be joined to the inner wall 87, and a second partition section 158 formed in this second inner joining section 157. This second partition section 158 has a second upper joining piece 159 formed so as to be joined by interleaving between the outer wall 73 and the welding flange section 98 of the upper wall 88, and a second lower joining piece 160 formed so as to be joined by interleaving between the outer wall 73 and the welding flange section 99 of the lower wall 89.

The stiffener 65 extends toward the rear of the vehicle, in substantial alignment with an extended line of the inner wall 25 of the front half frame section 44 of the front side frame 17. The front end 65a of the stiffener body 113 is joined to the stiffener-joined section 90 of the inner wall 87 of the frame body 18. The upper flange 129 of the stiffener body 113 is joined to the upper wall 88 of the frame body 18. The lower flange 130 of the stiffener body 113 is joined to the lower wall 89 of the frame body 18. The rear end 65b of the stiffener body 113 is joined so as to be interleaved between the box member 20 and the outer wall 73.

Next, the box member 20 will be described on the basis of FIGS. 19, 20, 23, and 24. The box member 20 mates with the rear end 66 of the front side frame 17.

A partition-side section 161 formed in the box member 20 partitions the inside of the front side frame 17. The inner coupling-side section 29 is formed on this partition-side section 161. The outside face of this inner coupling-side section 29 is joined so as to overlap the inside face of the inner wall 87 of the front side frame 17. The inside face of the inner coupling-side section 29 is joined so as to overlap the outside face of an inner wall section 162 of the floor frame 36.

Figure 23:
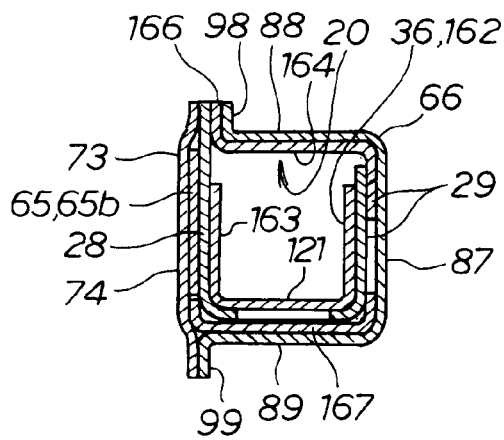
FIG. 23 is an enlarged sectional view taken along line 23-23 of FIG. 16.
Figure 24:
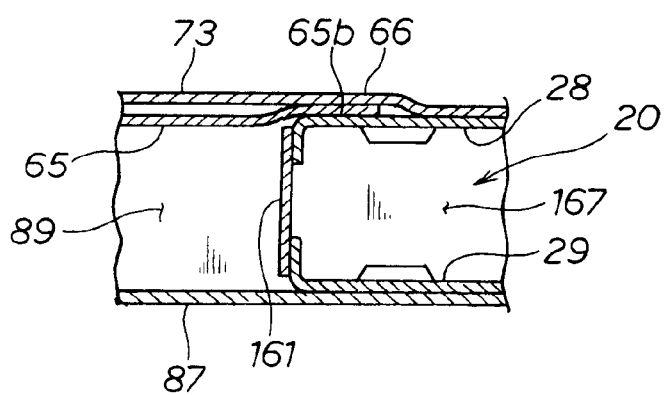
FIG. 24 is an enlarged sectional view taken along line 24-24 of FIG. 16.

The box member 20 has an outer coupling-side section 28 opposing the partition-side section 161. As shown in FIG. 23, the outside face of this outer coupling-side section 28 is joined so as to overlap the rear end 65a of the stiffener 65, and is joined to the outer wall 73 via the rear end 65a of this stiffener 65. The inside face of the outer coupling-side section 28 is joined so as to overlap the outside face of the outer wall section 163 of the floor frame 36.

The box member 20 has a coupling top section 164 integrally formed with the inner coupling-side section 29. This coupling top section 164 is overlappingly joined to the inside face of the upper wall 88 of the front side frame 17. An upwardly-extending reinforcing rib section 165 and a welding flange 166 are integrally formed on the coupling top section 164.

A coupling bottom section 167 is formed on the lower section of the partition-side section 161, and continues therefrom. The outside face of this coupling bottom section 167 is joined so as to overlap the inside face of the lower wall 89 of the front side frame 17. The inside face of the coupling bottom section 167 is joined so as to overlap the outside face of the bottom section 168 of the floor frame 36.

Figure 25:
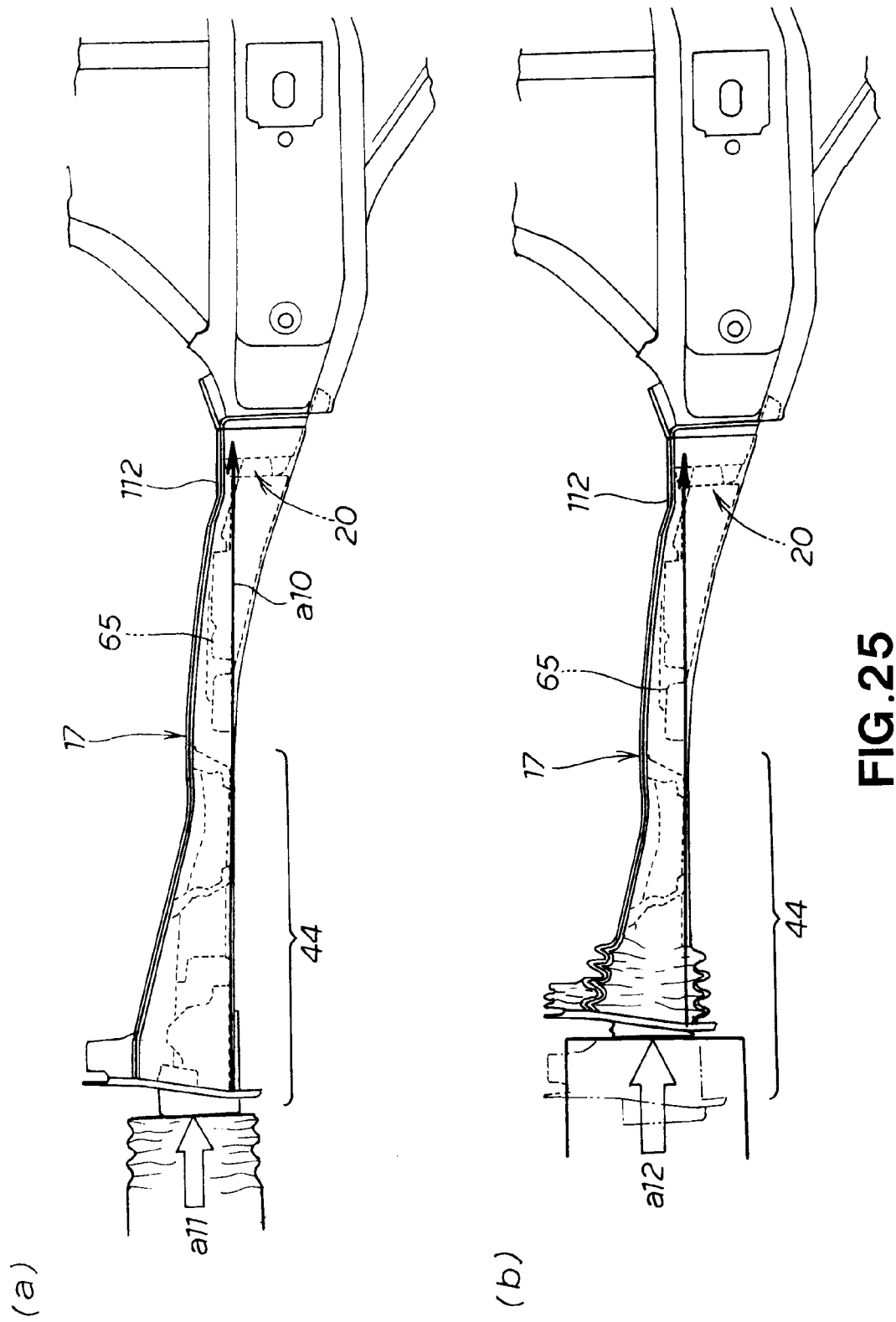
FIG. 25 is a view showing a state of impact absorption by a right front side frame during a low-speed vehicle collision.

Next, a state of crumpling of the front half frame section 44 of the right front side frame 17 in a vehicle collision is described on the basis of FIG. 25.

When the vehicle is involved in a collision, the impact load therefrom is delivered from the front half frame section 44 of the front side frame 17 to the stiffener 65 toward the rear of the vehicle in the manner shown by arrow a10, then delivered from the stiffener 65 to the box member 20.

As shown in FIG. 25(a), in the event of a head-on collision with another vehicle at low speed, when a relatively small impact force is borne by the front side frame 17 in the manner shown by arrow a11, the impact force is delivered rectilinearly to the box member 20 via the stiffener 65, and therefore the front side frame 17 does not deform under the impact force encountered with the vehicle at low speed.

As shown in FIG. 25(b), in the event of a collision with another vehicle at low speed, when a large impact force is input to the front side frame 17 in the manner shown by arrow a12, the impact force is delivered rectilinearly to the box member 20 via the stiffener 65. Because the box member 20 disperses the impact force, the second valley 112 does not deform, whereas the front half frame section 44 of the front side frame 17 experiences compressive deformation, absorbing the large impact force of a low-speed collision.

Figure 26:
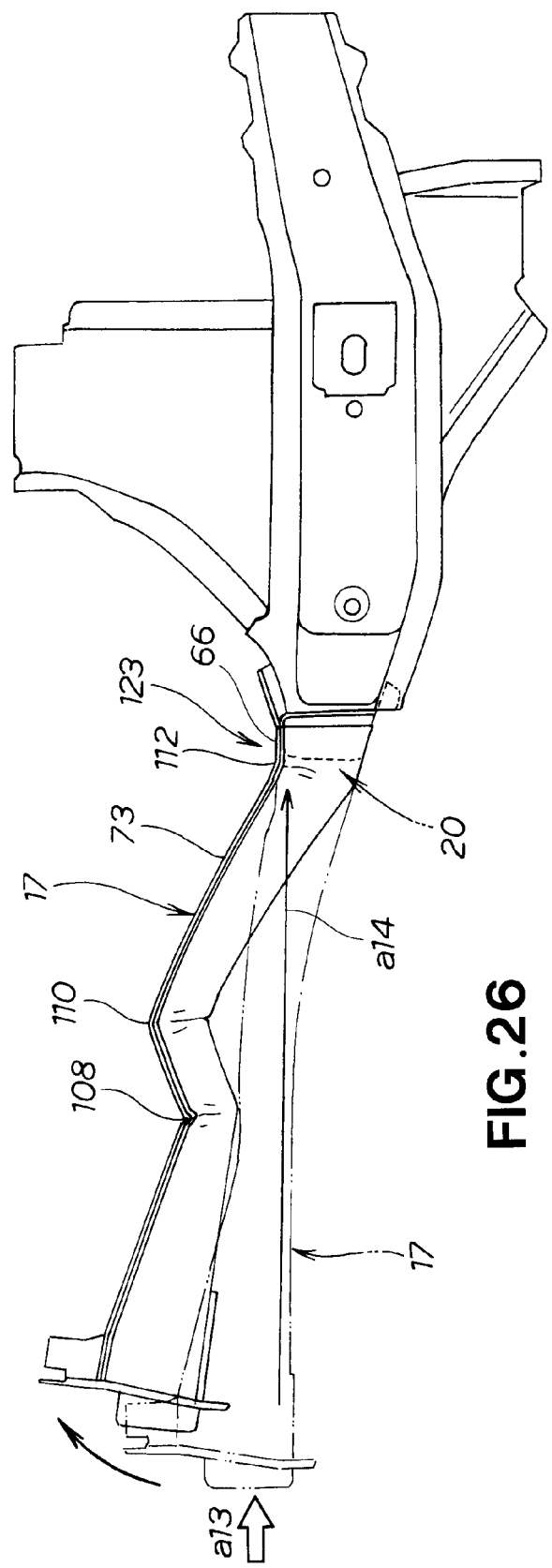
FIG. 26 is a view showing a state of folding deflection of a right front side frame during an offset vehicle collision.

Next, when the vehicle is involved in an offset collision, as shown in FIG. 26, the impact force is input to the front side frame 17 as indicated by arrow a13, and folds under the impact force the front side frame 17 at a point immediately forward of the box member 20, absorbing the impact force.

At this time, the zone of folding of the front side frame 17 (the second valley 112) and the zone to the rear thereof mated with the box member 20 are supported by the box member 20, and therefore do not collapse in a way that pushes in the outer wall 73 inside. Specifically, when impact force is input, folding can take place in the zone of desired folding.

When impact force is input, the impact force is transmitted from the stiffener 65 (FIG. 17) to the outer coupling-side section 28 of the box member 20 and to the frame rear end 66 of the outer wall 73 as shown by arrow a14; therefore, in the frame rear end 66 of the outer wall 73, the impact force becomes concentrated in the boundary section 123 constituting the boundary with the box member 20, and particularly in the second valley 112 of the boundary section 123, whereupon folding is initiated from an origin at the second valley 112 which is the boundary section 123 with the box member 20.

In this way, due to the box member 20, the outer wall 73 (rear end 66) in the portion behind the folding point where folding is intended to occur (the boundary section 123, the second valley 112) does not collapse, whereby stress can be concentrated at the folding point where folding is intended to occur. As a result, the impact force can be reliably absorbed at the established location of the point of folding.

Because the box member 20 supports the front side frame 17 from the inside thereof, collapse of the outer wall 73 in the portion behind the point of folding (the boundary section 123, the second valley 112) can be prevented.

As shown in FIG. 26, because impact force becomes concentrated at the first valley 108 and the crest 110 of the front side frame 17 as well, the front side frame is bent at the first valley 108 in the form of a V-shape and at the crest 110 in the form of an inverted-V-shape, absorbing the impact force.

Figure 22:
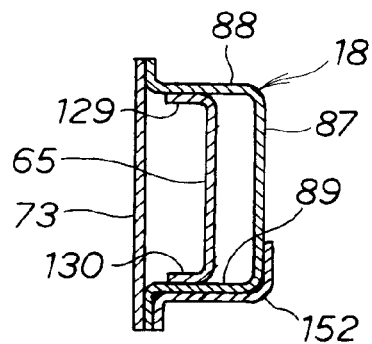
FIG. 22 is an enlarged sectional view taken along line 22-22 of FIG. 16.

As shown in FIG. 22, the upper flange 129 and the lower flange 130 of the stiffener 65 are respectively joined to the upper wall 88 and the lower wall 89 of the inner wall 87 of the frame body 18, and therefore the inside of the frame body 18 having a rectangular cross-section is split into left and right parts by the stiffener 65, forming left and right closed cross-sectional shapes. As a result, folding of the front side frame 17 in the vertical direction of the vehicle can be prevented.

Figure 27:
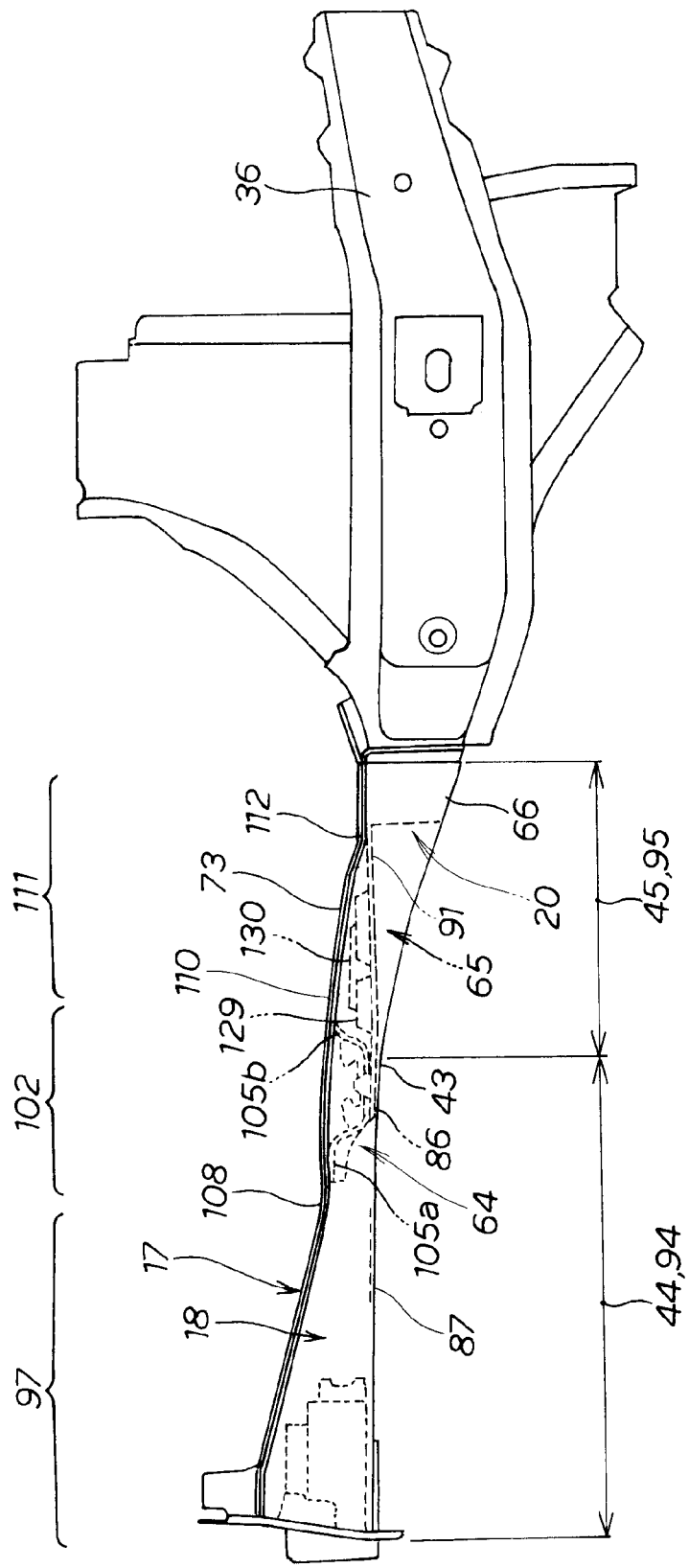
FIG. 27 is a plan view showing a state of joining of a bulkhead and a stiffener within a right front side frame.

As shown in FIG. 27, like the left front side frame, the right front side frame 17 may comprise a bulkhead 64 and a stiffener 65B, and may further comprise a first valley 108, a crest 110, and a second valley 112.

The bulkhead 64 is connected to the inside of the border (the center 43) of the front half frame section 44 and the rear half frame section 45 of the frame body 18. The front end 86 of the stiffener 65 is joined to the inner wall 87 of the frame body 18 by the bulkhead 64.

The upper flange 129 and the lower flange 130 of the stiffener 65 are respectively joined to the upper wall 88 and the lower wall 89 which continue from the inner wall 87 and the outer wall 73 of the frame body 18.

The front half frame section 44 serves as a rectilinearly-formed front half axial load bearing section 94; and the rear half frame section 45 as a rear half inner wall section 95 contiguous with the front half axial load bearing section 94 and extending in a curved form. A first end (the front end 86) of the stiffener 65 continues from the front half axial load bearing section 94 and extends rectilinearly to connect the other end (the rear end 91) of the stiffener 65 to the rear end 66 of the outer wall 73, whereby the stiffener 65 functions as a rear half axial load bearing section continuing rectilinearly from the front half axial load bearing section 94.

The outer wall 73 induces threefold inflection of the right front side frame 17. The front outer wall section 97 is formed on an incline so as to give the frame body 18 a diminishing cross-sectional area toward the bulkhead 64.

The first valley 108 is formed to constitute a boundary with the front outer wall section 97; and a center section 102 is formed along the bulkhead 64, contiguously with the first valley 108 and substantially parallel to the front half axial load bearing section 94.

The crest 110 is formed to constitute a boundary with the center section 102, and a rear outer wall section 111 is formed contiguously with the crest 110 and substantially parallel to the rear half inner wall section 95. The second valley 112 is formed at the rear end of the rear outer wall section 111 (the rear end 66).

The bulkhead 64 couples the front half axial load bearing section 94 and the rear half axial load bearing section (the stiffener 65); and one end portion 105a and the opposite end portion 105b of the bulkhead 64 are joined to the center section 102 of the outer wall 73 opposing this coupled zone. The first and second valleys 108, 112 are formed by depressing the outer wall 73.

Figure 10:
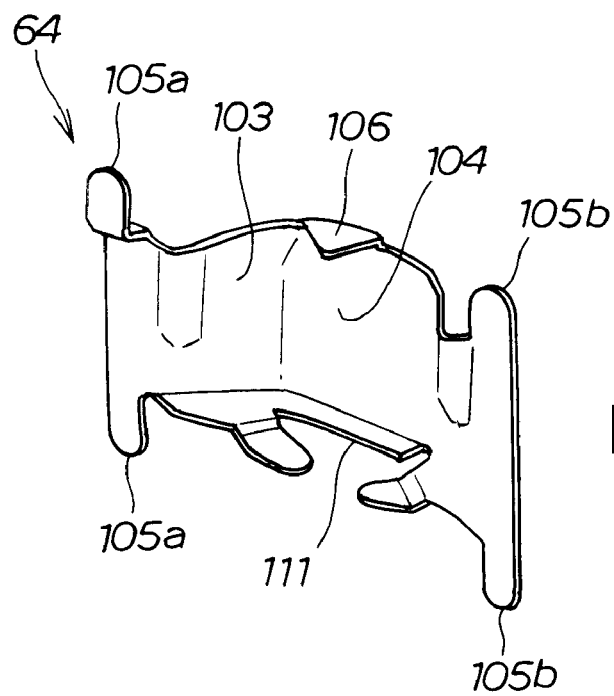
FIG. 10 is a perspective view of the bulkhead shown in FIG. 3.
Figure 11:
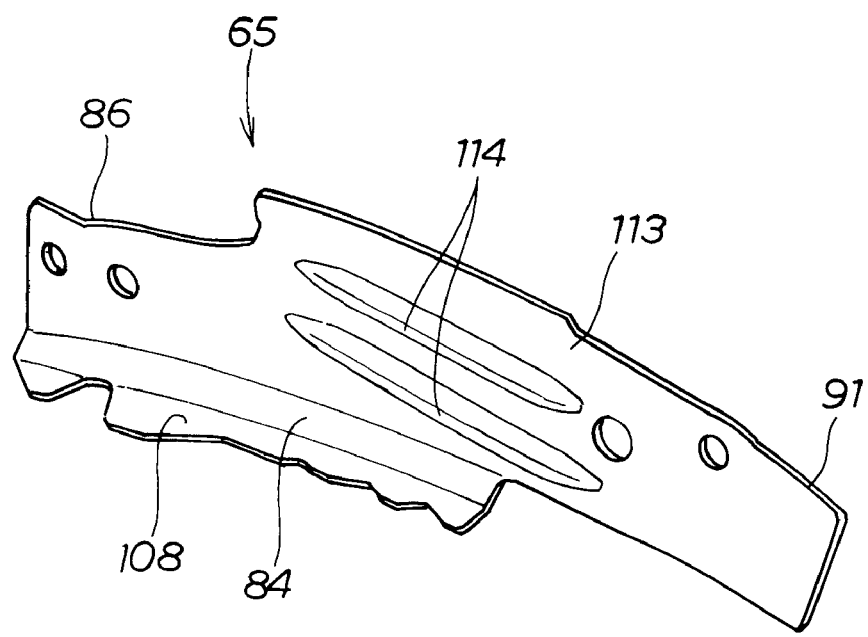
FIG. 11 is a perspective view of the stiffener shown in FIG. 3.

The bulkhead 64 which is joined to the inside of the right front side frame 17 is of symmetrical shape to the bulkhead shown in FIG. 10.

INDUSTRIAL APPLICABILITY

The vehicle body front structure of the present invention is suitable for a vehicle body.

REFERENCE SIGNS LIST

11: vehicle body front section
12: vehicle
15: front body
16: left front side frame
17: right front side frame
24: passenger compartment
25: floor (underbody)
32: left side sill
33: right side sill
43: center of front side frame
44: moment receiving section (rear half frame section)
45: rectilinear section (front half frame section)
53: outrigger
58: front end of front side frame
64: bulkhead (center bulkhead)
65: stiffener
66: rear end of front side frame
77: corner of rectilinear section
78: first ridge constituting corner of rectilinear section
81: corner of rectilinear section
82: corner of rectilinear section
84: second ridge
86: front end of stiffener
91: rear end of stiffener
93: outer wall section of outrigger

The invention claimed is:

1. A front part structure of a vehicle body, comprising:
a front body including left and right front side frames extending forward from a floor of a passenger compartment;
a stiffener;
the left and right front side frames each including a frame body having a rectangular closed cross-section; and
the frame body including an inner wall defining a lateral inside of the frame body, and an outer wall defining a lateral outside of the frame body;
wherein the frame body comprises:
a front end;
a center;
a front half extending from the front end to the center, the front half defining a rectilinear section of the frame body;
a rear half contiguous with the rectilinear section and curved laterally inward of the vehicle body, the rear half defining a moment receiving section of the frame body;
the rectilinear section having corners including an inner corner defining a first ridge;
the stiffener being connected to a rear end of the front side frame;
the stiffener having a rectilinear second ridge located within the moment receiving section, the second ridge being connected to the first ridge; and
a bulkhead disposed within the front side frame, the first and second ridges being connected to each other with the bulkhead joined to a front section of the stiffener.

2. A front part structure of a vehicle body, comprising:
a front body including left and right front side frames extending forward from a floor of a passenger compartment;
a stiffener;
the left and right front side frames each including a frame body having a rectangular closed cross-section; and
the frame body including an inner wall defining a lateral inside of the frame body, and an outer wall defining a lateral outside of the frame body;
wherein the frame body comprises:
a front end;
a center;
a front half extending from the front end to the center, the front half defining a rectilinear section of the frame body;
a rear half contiguous with the rectilinear section and curved laterally inward of the vehicle body, the rear half defining a moment receiving section of the frame body;

the rectilinear section having corners including an inner corner defining a first ridge;

the stiffener being connected to a rear end of the front side frame; and the stiffener having a rectilinear second ridge located within the moment receiving section, the second ridge being connected to the first ridge, wherein the first ridge and the second ridge define a lower end of the lateral inside of the frame body, and the stiffener has a rear section contiguous with an outer wall section of an outrigger connectable to a side sill located on a left side or a right side of an underbody, the outer wall section of the outrigger defining a lateral outside of the outrigger.

3. A front part structure of a vehicle body, comprising:

a front body including left and right front side frames extending forward from a floor of a passenger compartment;

a stiffener;

the left and right front side frames each including a frame body having a rectangular closed cross-section; and the frame body including an inner wall defining a lateral inside of the frame body, and an outer wall defining a lateral outside of the frame body;

wherein the frame body comprises:

a front end;

a center;

a front half extending from the front end to the center, the front half defining a rectilinear section of the frame body;

a rear half contiguous with the rectilinear section and curved laterally inward of the vehicle body, the rear half defining a moment receiving section of the frame body;

the rectilinear section having corners including an inner corner defining a first ridge;

the stiffener being connected to a rear end of the front side frame; and the stiffener having a rectilinear second ridge located within the moment receiving section, the second ridge being connected to the first ridge;

a bulkhead joined to the center of the frame body defining a boundary between the front and rear halves of the frame body, wherein the inner wall comprises:

a front end;

a front half extending rectilinearly from the front end to a center of the bulkhead, the front half of the inner wall defining an axial load bearing section of the frame body; and a curved rear half contiguous with the front half defining the axial load bearing section, wherein the front side frame has three bends including a first valley, a crest and a second valley, and the outer wall comprises:

a front section;

a center section;

a rear section;

the first valley being formed at a boundary between the front section of the outer wall and the center section of the outer wall;

the crest being formed at a boundary between the center section of the outer wall and the rear section of the outer wall;

the second valley being formed at a rear end of the rear section of the outer wall;

the outer wall having a front bulkhead-connected portion connected to one end portion of the bulkhead;

the front section of the outer wall extending in an inclined fashion toward the front bulkhead-connected portion such that the frame body has a cross-sectional area reducing gradually toward the front bulkhead-connected portion;

the outer wall having a rear bulkhead-connected portion connected to an opposite end portion of the bulkhead;

the center section of the outer wall extending from the first valley to the rear bulkhead-connected portion in substantially parallel to the front half of the inner wall; and the rear section of the outer wall being substantially parallel to the rear half of the inner wall.

4. The structure of claim 3, wherein the one end portion of the bulkhead overlaps and is joined to the front bulkhead-connected portion of the outer wall, the opposite end portion of the bulkhead overlaps and is joined to the rear bulkhead-connected portion of the outer wall, and the center of the bulkhead overlaps and is joined to the front half of the inner wall.

5. The front structure of claim 3, wherein the outer wall has depressions defined by the first and second valleys.

6. The structure of claim 1, further comprising a box member joining a rear end of the frame body to a floor frame constituting part of the floor, wherein the stiffener is disposed within the rear half of the frame body, wherein the stiffener has a front end joined to the front half of the frame body and a rear end joined to a rear end of the outer wall, and wherein the box member has an outer section joined to the rear end of the stiffener and an inner section joined to the rear end of the frame body, the inner section of the box member being opposed to the outer section of the box member.

7. The structure of claim 2, further comprising a box member joining a rear end of the frame body to a floor frame constituting part of the floor, wherein the stiffener is disposed within the rear half of the frame body, wherein the stiffener has a front end joined to the front half of the frame body and a rear end joined to a rear end of the outer wall, and wherein the box member has an outer section joined to the rear end of the stiffener and an inner section joined to the rear end of the frame body, the inner section of the box member being opposed to the outer section of the box member.

8. The structure of claim 3, further comprising a box member joining a rear end of the frame body to a floor frame constituting part of the floor, wherein the stiffener is disposed within the rear half of the frame body, wherein the stiffener has a front end joined to the front half of the frame body and a rear end joined to a rear end of the outer wall, and wherein the box member has an outer section joined to the rear end of the stiffener and an inner section joined to the rear end of the frame body, the inner section of the box member being opposed to the outer section of the box member.

9. The structure of claim 7, further comprising a bulkhead connected to an inside of the center of the frame body between the front half of the frame body and the rear half of the frame body, wherein the front end of the stiffener is joined by the bulkhead to the inner wall of the frame body.

10. The structure of claim 6, wherein the stiffener has an upper flange joined to an upper wall contiguous with the inner and outer walls, and a lower flange joined to a lower wall contiguous with the inner and outer walls.

11. The structure of claim 7, wherein the stiffener has an upper flange joined to an upper wall contiguous with the inner and outer walls, and a lower flange joined to a lower wall contiguous with the inner and outer walls.

12. The structure of claim 8, wherein the stiffener has an upper flange joined to an upper wall contiguous with the inner and outer walls, and a lower flange joined to a lower wall contiguous with the inner and outer walls.

13. The structure of claim 6, wherein the front half of the frame body includes a rectilinear front half of an axial load bearing section of the frame body, the front half of the axial load bearing section of the frame body being defined by a front half of the inner wall,
wherein the rear half of the frame body includes a curved rear half of the inner wall contiguous with the front half of the axial load bearing section of the frame body,
wherein the stiffener extends rectilinearly and defines a rear half of the axial load bearing section of the frame body, the rear half of the axial load bearing section of the frame body being contiguous with the front half of the axial load bearing section of the frame body,
wherein the stiffener has one end contiguous with the front half of the axial load bearing section of the frame body and an opposite end connected to the rear end of the outer wall,
wherein the front side frame has three bends including a first valley, a crest and a second valley,
wherein the vehicle body front structure further comprises a bulkhead connected to an inside of the center of the frame body between the front half of the frame body and the rear half of the frame body,
wherein the outer wall includes:
a front section extending in an inclined fashion toward the bulkhead such that the frame body has a cross-sectional area reducing gradually toward the bulkhead;
a center section extending along the bulkhead in substantially parallel to the front half of the axial load bearing section; and
a rear section extending in substantially parallel to the rear half of the inner wall,
wherein the first valley defines a boundary between the front section of the outer wall and the center section of the outer wall,
wherein the crest defines a boundary between the center section of the outer wall and the rear section of the outer wall,
wherein the second valley is formed at the rear end of the rear section of the outer wall.

14. The structure of claim 7, wherein the front half of the frame body includes a rectilinear front half of an axial load bearing section of the frame body, the front half of the axial load bearing section of the frame body being defined by a front half of the inner wall,
wherein the rear half of the frame body includes a curved rear half of the inner wall contiguous with the front half of the axial load bearing section of the frame body,
wherein the stiffener extends rectilinearly and defines a rear half of the axial load bearing section of the frame body, the rear half of the axial load bearing section of the frame body being contiguous with the front half of the axial load bearing section of the frame body,
wherein the stiffener has one end contiguous with the front half of the axial load bearing section of the frame body and an opposite end connected to the rear end of the outer wall,
wherein the front side frame has three bends including a first valley, a crest and a second valley,
wherein the vehicle body front structure further comprises a bulkhead connected to an inside of the center of the frame body between the front half of the frame body and the rear half of the frame body,
wherein the outer wall includes:
a front section extending in an inclined fashion toward the bulkhead such that the frame body has a cross-sectional area reducing gradually toward the bulkhead;
a center section extending along the bulkhead in substantially parallel to the front half of the axial load bearing section; and
a rear section extending in substantially parallel to the rear half of the inner wall,
wherein the first valley defines a boundary between the front section of the outer wall and the center section of the outer wall,
wherein the crest defines a boundary between the center section of the outer wall and the rear section of the outer wall,
wherein the second valley is formed at the rear end of the rear section of the outer wall.

15. The structure of claim 13, wherein the bulkhead has a portion interconnecting the front half of the axial load bearing section and the rear half of the axial load bearing section, the bulkhead being joined to the center section of the outer wall, the center section of the outer wall being opposed to the portion of the bulkhead.

16. The structure of claim 14, wherein the bulkhead has a portion interconnecting the front half of the axial load bearing section and the rear half of the axial load bearing section, the bulkhead being joined to the center section of the outer wall, the center section of the outer wall being opposed to the portion of the bulkhead.

17. The structure of claim 13, wherein the outer wall has depressions defined by the first and second valleys.

18. The structure of claim 14, wherein the outer wall has depressions defined by the first and second valleys.

* * * * *